(12) United States Patent
Habib et al.

(10) Patent No.: US 11,368,020 B2
(45) Date of Patent: Jun. 21, 2022

(54) SHARED POWER GENERATION TO IMPROVE ELECTRIC GRID SYSTEM RELIABILITY

(71) Applicant: THE REGENTS OF THE UNIVERSITY OF CALIFORNIA, Oakland, CA (US)

(72) Inventors: Abdulelah Habib, La Jolla, CA (US); Raymond de Callafon, La Jolla, CA (US); Vahid Rasouli Disfani, La Jolla, CA (US); Jan Kleissl, La Jolla, CA (US); John Holmes, La Jolla, CA (US); Elizabeth Ratnam, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 196 days.

(21) Appl. No.: 16/484,382

(22) PCT Filed: Feb. 7, 2018

(86) PCT No.: PCT/US2018/017306
§ 371 (c)(1),
(2) Date: Aug. 7, 2019

(87) PCT Pub. No.: WO2018/148341
PCT Pub. Date: Aug. 16, 2018

(65) Prior Publication Data
US 2020/0176985 A1 Jun. 4, 2020

Related U.S. Application Data

(60) Provisional application No. 62/456,099, filed on Feb. 7, 2017.

(51) Int. Cl.
*H02J 3/14* (2006.01)
*H02J 3/06* (2006.01)
(Continued)

(52) U.S. Cl.
CPC .............. *H02J 3/06* (2013.01); *G05B 13/042* (2013.01); *H02J 3/01* (2013.01); *H02J 3/14* (2013.01);
(Continued)

(58) Field of Classification Search
CPC ........ H02J 3/06; H02J 3/14; H02J 3/01; H02J 3/32; H02J 3/381; H02J 2300/28;
(Continued)

(56) References Cited

U.S. PATENT DOCUMENTS

2012/0078431 A1 3/2012 Weatherhead
2012/0283888 A1* 11/2012 Mao .................. H02J 3/386
700/291
(Continued)

OTHER PUBLICATIONS

A. Chuang and M. McGranaghan, "Functions of a local controller to coordinate distributed resources in a smart grid," 2008 IEEE Power and Energy Society General Meeting—Conversion and Delivery of Electrical Energy in the 21st Century, 2008, pp. 1-6, doi: 10.1109/PES.2008.4596887 (Year: 2008).*
(Continued)

*Primary Examiner* — Christopher E. Everett
(74) *Attorney, Agent, or Firm* — Sheppard, Mullin, Richter & Hampton LLP

(57) ABSTRACT

Systems and methods for optimizing energy distribution are disclosed. Exemplary embodiment may: receive a request for separating a grid sub-network from a greater grid network at a grid point of common coupling, and wherein the greater grid network comprises a first set of premises, a first set of energy resources, and a first set of premise points of common coupling; separate the grid sub-network, wherein the grid sub-network comprises a second set of premises, a second set of energy resources, and a second set of premise points of common coupling; distribute energy from the second set of energy resources to the second set of premises
(Continued)

of the grid sub-network; receive a request to reintegrate the grid sub-network to the greater grid network; reintegrate the grid sub-network; and distribute energy from the first set of energy resources to the first set of premises of the greater grid network.

22 Claims, 18 Drawing Sheets

(51) Int. Cl.
*G05B 13/04* (2006.01)
*H02J 3/01* (2006.01)
*H02J 3/32* (2006.01)
*H02J 3/38* (2006.01)

(52) U.S. Cl.
CPC ............... *H02J 3/32* (2013.01); *H02J 3/381* (2013.01); *H02J 2300/24* (2020.01); *H02J 2300/28* (2020.01)

(58) Field of Classification Search
CPC ............ H02J 2300/24; H02J 13/00034; H02J 2300/10; H02J 3/383; H02J 3/386; H02J 13/0006; G05B 13/042; Y04S 20/222; Y04S 10/123; Y04S 10/50; Y04S 10/14; Y02B 70/3225; Y02E 60/00; Y02E 40/70; Y02E 10/76; Y02E 70/30; Y02E 10/56
See application file for complete search history.

(56) References Cited

U.S. PATENT DOCUMENTS

| | | |
|---|---|---|
| 2013/0187454 A1 | 7/2013 | Timbus et al. |
| 2015/0012146 A1 | 1/2015 | Cherian et al. |
| 2016/0197477 A1* | 7/2016 | Majumder ................ H02J 3/14 307/24 |
| 2017/0005473 A1* | 1/2017 | Somani ................... H02J 3/381 |

OTHER PUBLICATIONS

International Search Report and Written Opinion in PCT/US2018/017306, dated May 7, 2018.

* cited by examiner

Columns represent averaged percentage of load met, by month, for 10 premise population. Red traces represent averaged load and DG.

SHARED POWER GENERATION TO IMPROVE ELECTRIC GRID SYSTEM RELIABILITY

RELATED APPLICATIONS

This application claims the benefit of U.S. Provisional Patent Application No. 62/456,009, filed on Feb. 7, 2017, the contents of which are incorporated herein by reference in their entirety.

TECHNICAL FIELD

The disclosed technology relates generally to shared power generation, and more particularly, several embodiments relate to systems and methods for shared power generation to optimize energy distribution over a grid sub-network.

DESCRIPTION OF THE RELATED ART

System level power outages or blackouts may result in millions of dollars in losses for electricity consumers and industrial, commercial, and residential electric utility customers. The cause of large scale outages may often be due to the effects of natural disasters, such as extreme weather storms, floods and earthquakes, although other causes exist. For example, in 2011, Northeastern United States lost power for weeks when Hurricane Sandy reached the urban coastline, resulting in losses of approximately $50 billion. Further examples such as the Northeast Blackout of 2003, and the Southwest Blackout of 2011, and others, may have occurred due to various sources of system failure, cascading effects of component failure, inappropriate fail-over or coordination of contingency methods, flawed control method implementation, operator error, lack or delay of maintenance and other causes. Moreover, the majority of grid outages may be small electric distribution scale outages, which, in aggregate, comprise huge economic detriment. The economic impacts of outages in the United States ranged $1.5 to $3.4 Trillion for 2015 and may be shown to be caused by electric distribution system outages, electric transmission outages, and electric generation outages. Moreover, in many cases, grid outages may be intentionally scheduled to accommodate system maintenance or modernization.

SUMMARY

Embodiments of the systems and methods disclosed herein provide systems and methods for optimizing energy distribution are disclosed. In various embodiments, a grid sub-network may be defined by an operational perimeter and under certain conditions, disconnected from a utility source at a point of common coupling (PCC). The grid sub-network may include one or more premises, energy generation resources, and energy storage systems (ESS). The grid sub-network may need to continue powering the premises within the grid sub-network through the use of energy generation resources and ESS. The energy generation resources and ESS may be distributed amongst the premises according to various strategies, whether or not the grid sub-network is separated from the greater grid by a point of common coupling. At the discretion and preference of the grid operator, the grid sub-network may be reconnected to the greater grid. The greater grid may power the grid sub-network using the energy generation resources and ESS of the greater grid.

In various embodiments, a strategy may maximize the number of premises in grid sub-network whose load may be served, wherein a given premise has a given load. In one embodiment, a strategy may maximize a number of switches made to individual premise points of common coupling. A strategy may maximize a utilization of energy generation resources to reduce power loss. In some embodiments, a strategy may use a weighting matrix, that prioritizes loads based on load-to-generation ratios for individual premises, critical loads, or other factors.

According to an embodiment of the disclosed technology, a method of optimizing energy distribution comprises a defined grid sub-network which may or may not receive a request for separating a grid sub-network from a greater grid network, wherein the grid sub-network is connected to the greater grid network at a grid point of common coupling, and wherein the greater grid network comprises a first set of premises, a first set of energy resources, and a first set of premise points of common coupling; separating the grid sub-network from the greater grid network at the grid point of common coupling, wherein the grid sub-network comprises a second set of premises, a second set of energy resources, and a second set of premise points of common coupling; distributing energy from at least some of the second set of energy resources to at least some of the second set of premises of the grid sub-network; receiving a request to reintegrate the grid sub-network to the greater grid network; reintegrating the grid sub-network to the greater grid network; and distributing energy from at least some of the first set of energy resources to at least some of the first set of premises of the greater grid network.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict example embodiments of the disclosed technology. These drawings are provided to facilitate the reader's understanding of the disclosed technology and shall not be considered limiting of the breadth, scope, or applicability thereof. It should be noted that for clarity and ease of illustration, these drawings are not necessarily made to scale.

Figure 1:
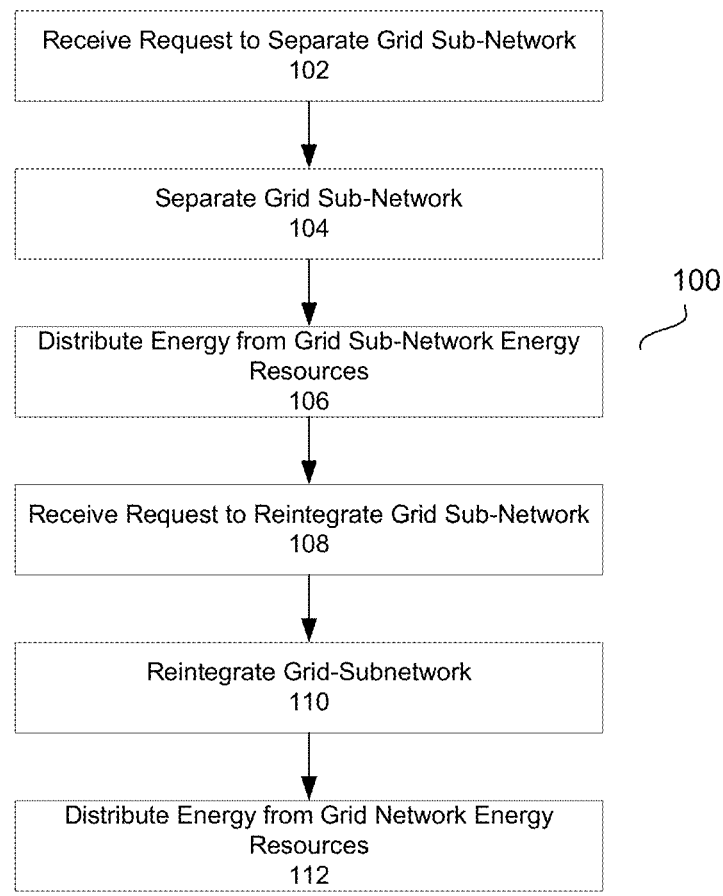
FIG. 1 is an operational flow diagram illustrating an example process for optimizing energy distribution according to one particular embodiment.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense; it is made merely for the purpose of describing the general principles of the disclosed embodiments. Numerous specific details may be set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

While uniformly subject to prevailing grid standards such as ANSI C84.1, electric power utility (Utility) assets can be operated in specific modes and configurations facilitating operation of sub-sections of the greater grid to help prevent or minimize the effects of these outage episodes, such as those that arise as a result of either planned or unplanned outages, and including those caused by natural disasters. Under certain Utility-defined conditions, such as alternate or alternative switching plans, portions of the greater grid can be temporarily operated in contingency configurations or modes to provide electric service in the absence of conventional operating modes. In certain cases, Utilities have also begun to introduce pre-defined areas of service which can be configured to carry load in the absence of greater grid interconnection. Operation of such a region may be referred to as an "island," and may be comprised of specific control equipment to manage load and generation and which can be configured to sustain operations for a period of time or indefinitely, depending on the loads and sustainable generation capacity of the area. Sometimes referred to as a "microgrid," these pre-defined sub-sections of the grid, referred to herein as "grid sub-networks," may be interconnected portions of a medium voltage distribution network surrounded by grid connection nodes referred to as a Point of Common Coupling (PCC). Voltage collapse, electric faults, or other interruptions in power or power quality at the PCC may trigger a Utility system operator, or an automated Distribution Management System/Outage Management System (DMS/OMS), to enable a grid sub-domain, or grid sub-network, to operate in an independent or "islanded" mode. The host Utility of such an OMS/DMS dispatches Utility owned assets to sustain such a grid sub-network.

The process for orchestration and sustained operation of a configurable grid sub-domain, or sub-network, which, upon outage onset or utility control, may not be operated or accommodated by an alternative Utility switching plan, either because of a large scale outage, the absence of a pre-defined grid sub-network topology or OMS/DMS, or because the outage may be at the end of a radial feeder with no alternative grid connection. In such a scenario, the systems and methods described herein define a plurality of scenario-based solution methods and practices enabling this sub-section of the grid to enter a fail-over mode, whether it may be located in a broad or narrow region of outage, or in outage conditions stemming from any planned or unplanned or emergency or contingency scenarios. Operation of the resulting sub-domain requires that a partially or completely independent and/or autonomous mode of control be activated to sustain electric service to the population of Utility customers in the grid sub-network which would otherwise be served by conventional grid operations.

Grid-interconnected energy systems may include Distributed Energy Resources (DER). Among these DER, Energy Storage Systems (ESS) may be used by Utilities in grid operations to mitigate the intermittency of solar photovoltaic (PV) or wind generation to help stabilize the grid, to increase reliability during outages, as well as to provide ancillary services, such as frequency and voltage regulation. These DER can be interconnected at either a Utility PCC or a customer premise PCC and can vary widely in power and energy capacity. Distributed Generation (DG) may be considered a subset of DER. Specific modes of dispatch of DER can also be applied to remedy issues of frequency control and to facilitate mitigation of harmonic or sub-harmonic disturbances relating to frequency management and grid synchronization. Such modes of DER dispatch may also be useful to Utilities during the episodes when a grid sub-network transitions into, and out of, islanded mode.

In outage conditions, local power generation capacity on a circuit or feeder may be insufficient to meet load demands. Therefore, optimization may be beneficial to the objective of scheduling of electric service to local facilities, to optimize or maximize the utilization of available power or energy, and consequently, minimize unused or lost energy. In some modes of grid operation (non-outage conditions), this method may be referred to as load scheduling or shedding. Linear Programming (LP) and Mixed-Integer Linear Programming (MILP) methods, and the associated variables to be optimized, may be separated into real and integer values for the purposes of rendering solutions for load scheduling. LP and MILP may be used to exploit convex optimization in solving a load scheduling problem. MILP may use integers to parametrize the power status of each premise with minimum up and down time constraints applied.

A configurable subsection of the grid, or grid sub-network, with DER of any kind, including Utility or Customer owned or sited electric generation and ESS assets connected to an electric grid distribution system via a main circuit breaker (CB) at the PCC may be assumed. The main CB may be used to isolate the relevant sub-section of the grid, or grid sub-network, from the greater grid network in case of power quality disruption or power outage. Any cluster of customer premises electrically "downstream," or more remote from the Utility substation, of the main CB, and which may be comprised of any category of utility customer, which may each have its own portfolio of load, electric Distributed Generation (DG) resource(s), ESS, and additional premise-located CB. The status of the CB connected to the PCC of the premise may be used in the optimization problem.

Described herein may be optimization methods for islanded operation in which DER power may be directly dispatched or distributed to neighboring premises within a distribution sub-network. Premise customers, each with or without permutations of DER at their location, may be assumed to be connected by a single point of common coupling (PCC) to a distribution network via Automated Metering Infrastructure (AMI or "Smart Meter") that provides metrology and remotely dispatchable disconnection/reconnection capabilities. These AMI devices may be assumed to be operable for a sufficient period of time after outage onset to facilitate the required communications to define and establish the grid sub-network. Also assumed may be a further enabling method of distribution transformer control which serves to electrically isolate a relevant portion or the entirety of the grid sub-network.

The algorithms may derive permutations of optimal power sharing scenarios to sustain or improve the reliability of electricity supply to any engaged premise on the feeder sub-section experiencing an outage. Results of the algorithmic output may be benchmarked against the isolated consumption case with and without ESS, which may be one example of DER. Two categories of ESS may be incorporated into the practice and method: Utility distribution system sited ESS and customer premise sited ESS. Where applicable, data from a Utility OMS/SMS outage duration estimation tool can be incorporated in the dispatch optimization algorithm, either as initially, or as available, to provide input to the algorithms supporting the dispatch optimization presented herein.

In some embodiments, an optimized power sharing system operates on an isolated portion, or sub-domain, of a greater distribution grid during periods of intended or unintended outage. This available power may be utilized to operate the utility communications networks within the given grid sub-network. In the cases described herein, this isolated sub-domain and associated communications network may be referred to as a sub-network of the grid ("sub-network") which can continue to operate independently and, where available, in conjunction with the communications system which supports the conventional distribution system assets in conjunction with associated and co-located DER interconnected on the sub-network. The power sharing system may be configured to enable application of contingency scenarios for providing electric service to the sub-network from the associated DER.

In some embodiments, some, or all, premise customers may achieve restored or uninterrupted electric service, resulting in higher Utility reliability metrics, when operating or pooling their DER-enabled power across the autonomously operated grid sub-network, or region, when compared to operation in isolated or islanded modes.

FIG. 1 is an operational flow diagram illustrating an example process for optimizing energy distribution according to one particular embodiment. At operation 102, the system may receive a request to separate the grid sub-network from the greater grid network. The grid sub-network may include one or more premises, DERs, and individual PCCs for each premise. The grid sub-network may be a smaller part of a greater grid. The grid sub-network may be connected to the greater grid network at a PCC. A premise may be a residential house, a commercial building, a hospital, an industrial building, or other system requiring energy. A DER may include an ESS, a DG, or other energy resources. An ESS may include a battery, capacitors, fuel cells, or other energy storage. A DG may include photovoltaics, wind, diesel generators, or other energy generation resources. The PCC may be a switch, a circuit breaker, or other device to connect and disconnect a system. The request may be received through a PCC to the system.

At operation 104, the grid sub-network may be separated, or disconnected, from the greater grid network in response to the request to separate the grid sub-network. The grid sub-network may be separated via a PCC. The grid sub-network may be separated to minimize disruption to the premises.

At operation 106, the system may distribute energy from the DER of the grid sub-network to all of the premises of the grid sub-network. The system may distribute energy from some of the DER of the grid sub-network to some of the individual premises of the grid sub-network. The energy may be distributed based on various strategies, as described herein.

At operation 108, the system may receive a request to reintegrate the grid sub-network into the greater grid network. The system may receive the request via the PCC. At operation 110, the grid sub-network may be reintegrated into the greater grid network via the PCC. The grid sub-network may be re-integrated to minimize disruption to the premises.

At operation 112, the system may distribute energy from the DER of individual premises of the greater grid network to all of the premises of the grid sub-network. The system may distribute energy from some of the DER of the greater grid network to some of the individual premises of the greater grid network. The energy may be distributed based on various strategies, as described herein.

Figure 2:
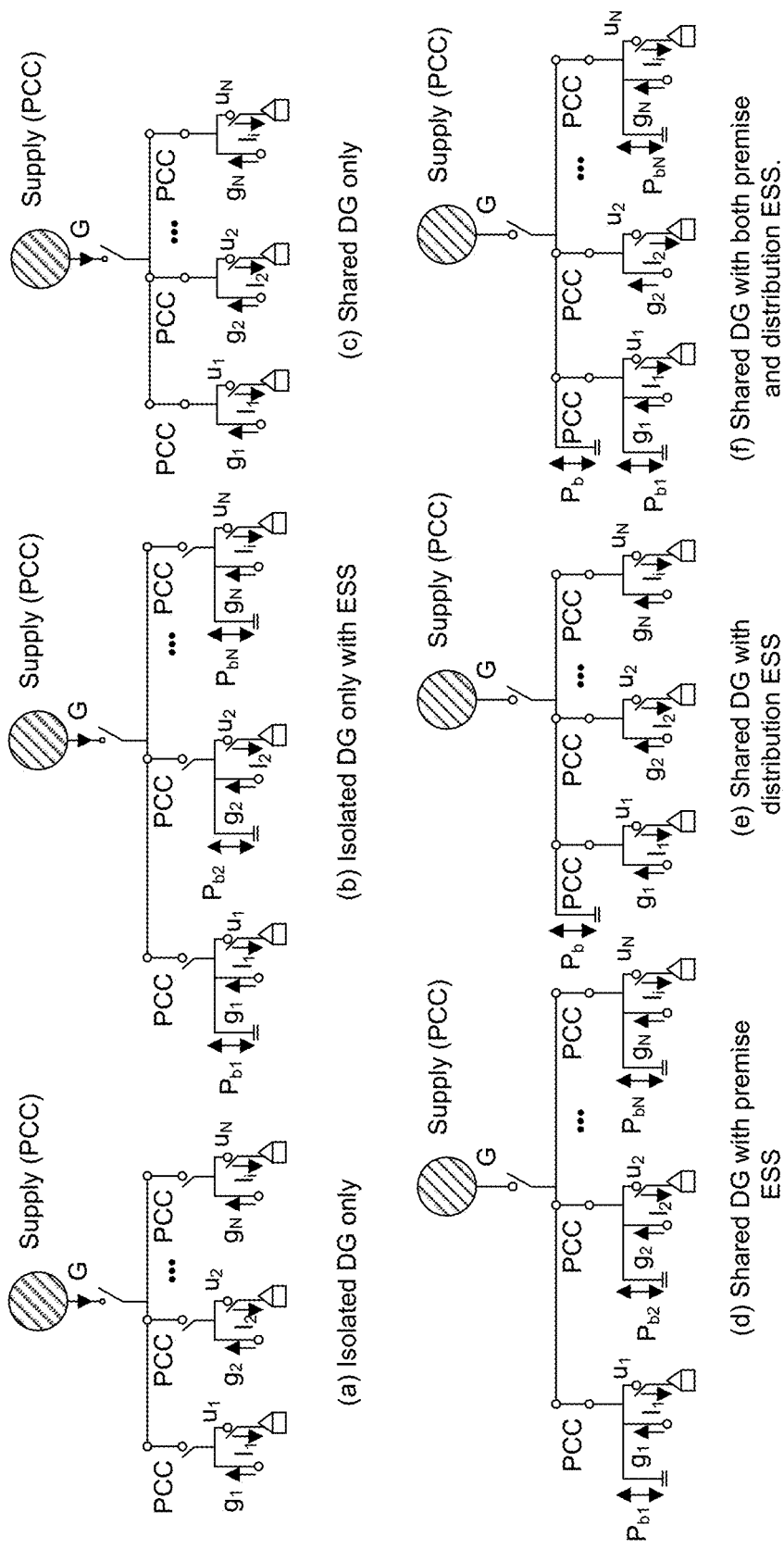
FIG. 2 illustrates example configurations for power generation and distribution of a grid sub-network according to one particular embodiment.

FIG. 2 illustrates example configurations for power generation and distribution of a grid sub-network according to one particular embodiment. More specifically, the diagram labeled (a) in FIG. 2 represents an isolated DG. For example, a premise may be operating individually through the use of solar panels or other DG. A premise may be kept isolated by keeping a PCC switch off. A premise may include a single family dwelling, apartment, condominium, commercial or industrial site, office, complex, factory, warehouse, campus, or other premise.

The diagram labeled (b) in FIG. 2 represents an isolated DG with ESS. Continuing the example, the premise may also have an ESS to store the solar energy collected from the solar panels and provide energy when the solar panels may not be able to directly provide energy to the premise.

The diagram labeled (c) in FIG. 2 represents a shared DG. For example, there may be one or more premises in a grid sub-network. At least some of the one or more premises may have DER that generate energy. The one or more premises may be connected to each other, such that the generated energy may be distributed to the one or more premises. The one or more premises may be kept connected by keeping a PCC switch on. The diagram labeled (d) in FIG. 2 represents a shared DG with premise ESS. A premise ESS may be a premise-sited ESS normally operating on the premise side of the PCC. For example, the one or more premises may each have decentralized storage, where each premise may stay connected by keeping the PCC switch on. Decentralized storage may be a plurality of premise ESS which can be configured to operate individually or collectively. The diagram labeled (e) in FIG. 2 represents a shared DG with distribution ESS. Distribution ESS may be a utility-operated ESS with a PCC on the electric distribution network. For example, a centralized storage may be connected to the one or more premises, where each premise may stay connected by keeping the PCC switch on. Centralized storage may be a premise-sited ESS that can supply power to a designated sub-network. Centralized storage may be used interchangeably with centralized ESS. The diagram labeled (f) in FIG. 2 represents shared DG with both premise and distribution ESS. For example, a centralized storage may be connected to the one or more premises which may each have decentralized storage, where each premise may stay connected by keeping the PCC switch on. The scenario matrix defining which premises may be disconnected or connected may be coordinated by the optimization problem, further described herein.

By way of example, the optimization problem can be presented in the following format:

$$\max_{U,G} f(U, G) \quad (1)$$

$$\text{s.t. } g(U, G) \leq 0$$

$$h(U, G) = 0$$

$$U \subset \{0, 1\}^{|U|}$$

$$G = \sum G_n$$

where $G_n$ is the power generated by the DER n which can be from any DG technology. The binary decision variable $U=[u_1, u_2, \ldots, u_N]^T$ is the matrix of connection statuses for all premises at all time steps during a temporal window of optimization T, such that $u_i(t)$ is the column vector of connection statuses for premise i for each t. This element, $u_i(t)$, defines premise AMI-controlled switch position (i.e. open or closed), and denotes which premises in the grid sub-network may be supplied with power at any time t.

$G_{ESS}$ is the power discharged from ESS and is a function of $E_b$, $E_0$, and $E_s$, where $E_b$ and $E_0$ are vectors of size N denoting the ESS energy nameplate capacity and initial stored energy in the ESS, and $E_s$ is a matrix defining ESS SoC energy at all times. The notation $P_b$ and $P_s$ is used to denote the differential with respect to time of energy (power). For any episode T, $E_0/E_s$ is the initial state of charge value correlating to the fraction of ESS nameplate stored energy in the ESS at the beginning of T. The objective function, inequality constraints, and equality constraints on ESS and systems limitations, as well as power balance, are denoted respectively by $f$, $g$ and $h$, elaborated below.

There may be multiple objective function cases, two of which are shown here: either to minimize DER resource curtailment or to maximize use of available generation. The following equations describe $f_1(U)$ which minimizes spill of PV energy (maximizes load supply) and $f_2(U)$ which maximizes the number premises that may be connected, respectively:

$$f_1(U) = 1^T \cdot U \cdot 1 \quad (2)$$

$$f_2(U) = 1^T \cdot (U \circ L) \cdot 1 \quad (3)$$

where 1 is a unity vector of length equal to the number of premises. The load matrix is denoted by $L=[l_1, l_2, \ldots, l_N]^T$ where $l_i$ is the column load vector of premise i during an optimization window (minute/hour/day/other variable horizon). The notation $U \circ L$ is used to represent the Hadamard (element-wise) product of the two matrices L and U. By defining $Y = U \circ L$ as a new constraint, the objective function $f_2$ can be updated as:

$$f_2(U) = 1^T \cdot (Y) \cdot 1 \quad (4)$$

The following describes any constraints to the power system, such as generation capacity at a given premise at any time t, available power (kW(t)), minimum connected-time and minimum disconnected-time, and ESS constraints, for example.

a. Generation capacity of any premise at any time is defined as:

$$Y - U \circ L = 0 \quad (5)$$

b. Available power: In island mode, the grid sub-network cannot provide more than the available total DER resource power, the sum of all available DER represented as G in the following equation. Thus, the total load and ESS charging power that the sub-network can supply must be less than the total DER resource power at each time step:

$$1^T \cdot (U \circ L) \leq 1^T \cdot G \quad (6)$$

c. Minimum Up-time and Minimum Down-time: A set of constraints may be defined to keep a unit which is switched on (off) in the same state for at least $m^+(m^-)$ time steps before it is switched off (on). These minimum up (down) time constraints decrease the risk of damage to load units or inconvenience for consumers due to frequent start-ups and shut-downs. The constraints are defined as:

$$u(i, t) - \sum_{h=t-m_i^+ +1}^{t} v(i, h) \leq 0 \ \forall_{m_i^+ \leq t \leq T} \quad (7)$$

$$(1 - u(i, t)) - \sum_{h=t-m_i^- +1}^{t} w(i, h) \leq 0 \ \forall_{m_i^- \leq t \leq T},$$

where the matrices $V \subset \{0,1\}^{|V|}$ and $W \subset \{0,1\}^{|W|}$ are start-up and shut-down matrices with the elements defined as:

$$v_{i,t_k} - w_{i,t_k} = u_{i,t_k} - u_{i,t_k-1} \ \forall_{1 \leq i \leq N} \forall_{2 \leq t_k \leq T}$$

$$v_{i,t_k} + w_{i,t_k} \leq 1 \ \forall_{1 \leq i \leq N} \forall_{2 \leq t_k \leq T}$$

$$v_{t,1} = w_{i,1} = 0 \ \forall_{1 \leq i \leq N} \quad (8)$$

where N is the number of premises and T is the simulation time.

d. ESS constraints: Assuming, for example, the efficiency of the ESS is 100%, and that a power to energy ratio of 4 is applied for the ESS nameplate capacity, the ESS constraints are defined as:

$$-P_b(i) \leq P_s(i,t) \leq P_b(i) \quad (9a)$$

$$E_s(i,t) = \sum_{h=1}^{t} P_s(i,h) \Delta t + E_0(i) \quad (9b)$$

$$E_s(i,1) = E_0(i) \quad (9c)$$

$$\forall_{i \in N} \forall t \in T \forall_{t_1 \in \{24 \ k \ hours | k \in N\}} \quad (9d)$$

where $E_0$ denotes the initial energy (kWh) stored in the ESS. The maximum charging/discharging power of the ESS may be limited to the ESS rating of equation 9a. Equation 9b calculates the energy stored in the ESS at each time step t. Further, deep discharge must be avoided for ESS health, as in equation 9c, where $\rho_{max}$ and $\rho_{min}$ thresholds may be applied as approximately 0.9 and 0.1, which represents SOC values of around 90 and around 10, respectively. To allow a clearer analysis without energy shifting from one episode to the next, the initial and final state of charge (SOC) during an episode T is forced to be equal.

e. Minimum Daily Connection to Grid Sub-Network: This constraint guarantees that each premise is connected to the grid sub-network at least once for a minimum up-time.

$$1 - U \cdot 1 \leq 0 \quad (10)$$

By implementing such an optimization based on customer premise scheduling, there may be an increase in the reliability in the load for sub-network customers during an planned or unplanned outage. As disclosed herein, the optimization may be based on MILP.

For example, the DER at each premise may be used either to meet premise demand or to be distributed across the sub-network. These isolated and shared scenarios may also be contemplated with and without premise or distribution sited ESS. The optimization also solves for the optimal ESS nameplate capacity, daily recommended initial SOC, and charge/discharge schedule for two isolated and four shared cases (six cases, as shown in FIG. 2: (1) isolated DG, (2) isolated DG with ESS, (3) shared DG, (4) shared DG with premise ESS, (5) shared DG with distribution ESS, (6) shared DG with both premise and distribution ESS).

Figure 3:
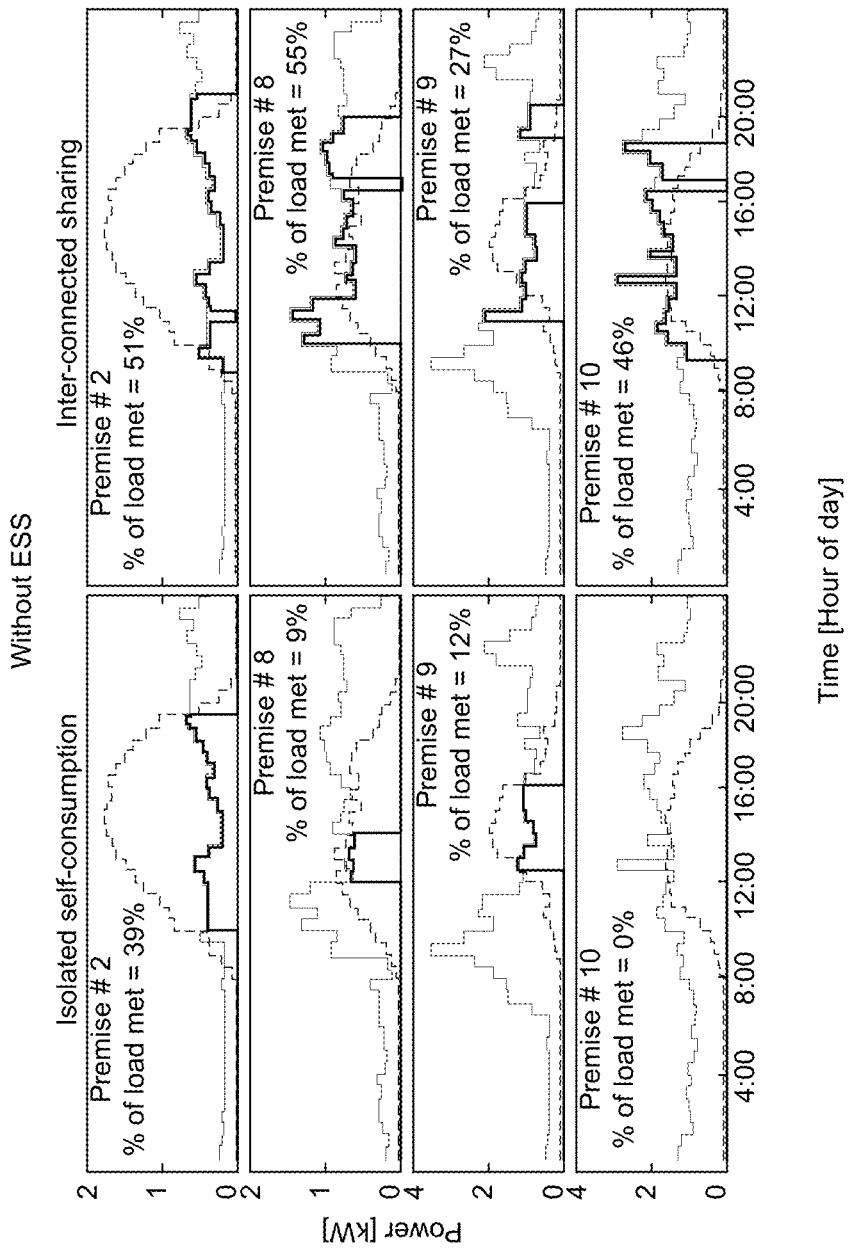
FIG. 3 illustrates the hourly results of four different premises in different scenarios according to one particular embodiment.
Figure 3:
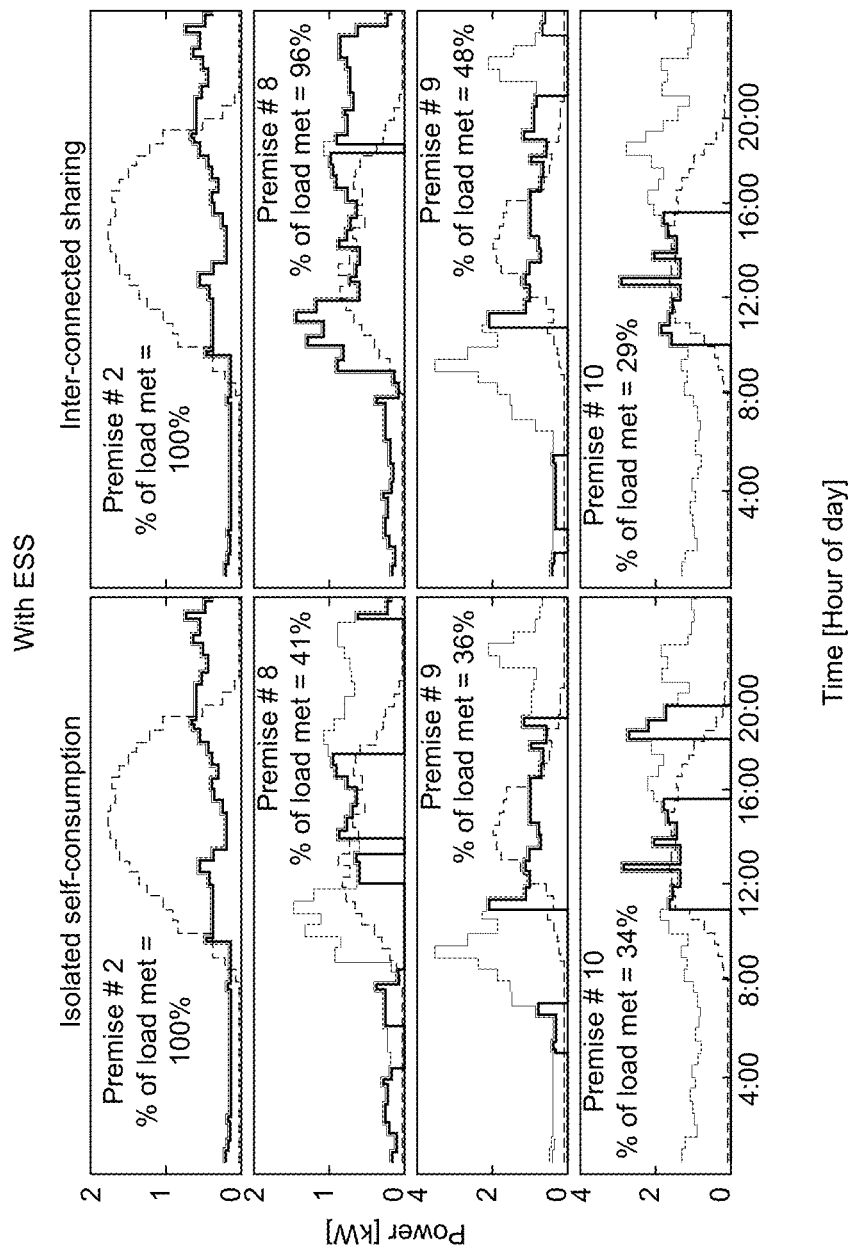

FIG. 3 illustrates the hourly results of four different premises in different scenarios according to one particular embodiment. A graph illustrates the hourly results of four different premises that may be isolated without an ESS in one instance, and another where each of the four premises may be connected to an ESS at another premise.

Under ideal conditions during an outage, the load of most premises may be met during the middle of the day. Without storage, excess distributed generation may be spilled. Spilled power may occur due to several scenarios: (i) at the generation peak when, for example total DG i.e., solar PV may be higher than total load; (ii) when the optimal combination of premises, but not necessarily all of the premises in the sub-network, has an aggregated discrete load that may be less than the available DG power, but, incrementally, not enough to cover an additional premise; (iii) when minimum up and down time constraints limit the choices of which premises to power, resulting in incomplete utilization of the generation, or other scenarios.

In the isolated cases without storage, as shown in portion (a) of FIG. 3, the excess DER generation may not be able to be preserved, regardless of sharing. For example, the total DER power generation for premise 2 most highly exceeds total power demand among the scenarios analyzed. In the isolated case, about 39% of the load is met, while in the shared case about 51% of the load is met. For premise 8, about 9% of the load is met in an isolated case, whereas about 55% of the load is met for the shared case. Premise 9 shows about twice the increase from an isolated case to a shared case. In the connected power sharing case, load is met during diurnal episodes for premise 10, with a small amount of energy, as supplied from neighboring premises, increasing the percent load met on this day from about 0% to about 46%. Nonetheless, no scenario presented may be able to surpass about 55%.

In some embodiments, a scenario is illustrated for the isolated case where ESS may be installed at a single premise and serve that particular premise. In this case, the ESS capacity is optimized to maximize the local DER resource utilization. If daily DER energy capacity exceeds daily load demands, as is the case for premise 2, excess DER energy can be stored because all load demands are met. Conversely, if daily DER resource energy is smaller than daily load demands, then episodes of insufficient capacity result in the need for load curtailment or service interruption may inevitably occur. For example, premises 8, 9, and 10 were able to meet the smaller load during the night or early morning but missed some of the peaks due to the limitation of DER resource energy.

In the connected case, the sub-network may feature a distribution interconnected ESS which can be operated to provide power for all premises. With this ESS scenario, the differences between the isolated and connected cases may be small. Premises 8 and 9 show improvement in meeting the load demands with available ESS capacity.

Compared to the no-ESS cases, the ESS cases, as illustrated in portion (b) of FIG. 3, may demonstrate the value of storing otherwise spilled DER resource energy which can be time shifted to meet load and minimum up-time constraints for episodes later in the day. For the isolated cases, the ESS may improve the system's ability to both meet load demands and extend opportunities for DER resource energy utilization. This may be the case for all premises in the grid sub-network, especially during days with periods of excess DER resource power. DER energy utilization may be below about 100% as losses can occur if the total DER resource energy exceeds the total daily load demand, as the case may be with oversized DER resource systems. For example, about 100% of the load is met for premise 2, in both the isolated case and the shared case. For premise 8, the percent of load met is more than double in the shared case. With ESS, the percent of load met in the shared case increased for premise 9. For premise 10, the percent of load met decreased in the shared case.

Figure 4:
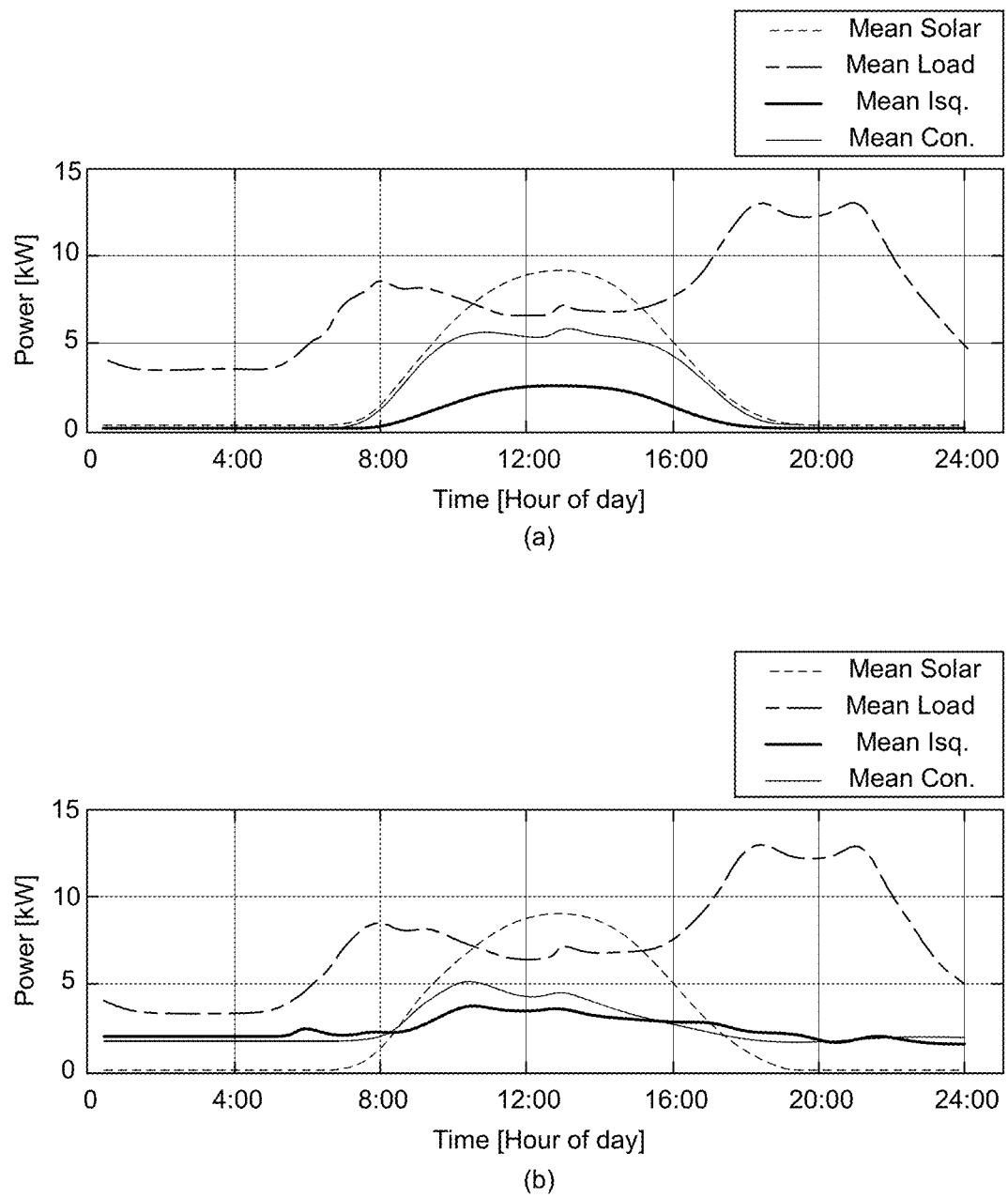
FIG. 4 illustrates average daily results for the sub-network with and without an Energy Storage System (ESS) for both isolated and shared cases over the course of a year according to one particular embodiment.

FIG. 4 illustrates average daily results for the sub-network with and without ESS for both isolated and shared cases over the course of a year according to one particular embodiment. The diagram labeled (a) in FIG. 4 illustrates the annual average daily available capacity and forecasted load for the grid sub-network without ESS for the isolated (non-shared) case and the inter-connected shared case. For the isolated case, premise load is met over the episode during which time DG exceeds load consumption for the minimum up-time. As a result about 9% of the total load may be met, as shown in Table 1 below, while the percentage of load met is approximately three times that in the shared case, as represented by a value of about 26.3%.

TABLE 1

Percent Load Met and Optimal ESS Size for Different Operating Strategies Over A Year, $P_b$ and $E_b$ are ESS Power and Energy Rating.

|  | % of load met | $P_b[E_b]$ kW [kWh] | % DG utilized |
|---|---|---|---|
| Isolated DG only | 9.2 | 0 | 25.8 |
| Isolated DG with ESS | 33.7 | 460.1 [115.1] | 94.9 |
| Shared DG only | 26.3 | 0 | 74 |
| Shared DG with premise ESS | 35.5 | 259.2 [64.1] | 100 |

Additionally, the optimization solves for the optimal ESS size $P_b[E_b]$ for every premise in the isolated case, as shown in Table 2. The grid connected case resulted in a recommended ESS capacity of about 259.2 kW [64.1 kWh] which is about 43% less than the aggregated ESS capacity for the isolated case. The ESS initial SOC for every day is optimized for the isolated case to average approximately about 5 kWh, whereas an optimized value of about 21.6 kWh is represented for the connected case.

TABLE 2

Optimal ESS Size $E_b$ and Initial Stored Energy $E_0$ for Each Premise in Isolated Mode

| Premise | $E_b$ (kWh) | $E_0$ (kWh) | % DG utilized |
|---|---|---|---|
| 1 | 10.6 | 5.2 | 99.3 |
| 2 | 12.7 | 4.5 | 82.8 |
| 3 | 8 | 3.1 | 93.3 |
| 4 | 13.5 | 6.7 | 79.6 |
| 5 | 17.2 | 7.2 | 99.3 |
| 6 | 11.6 | 5.5 | 98.9 |
| 7 | 9.1 | 3.8 | 99 |
| 8 | 8.5 | 3.6 | 99.6 |
| 9 | 11.2 | 6 | 99.4 |
| 10 | 12.7 | 5 | 99.1 |
| $\Sigma E_b$ | 115.1 | | |

The diagram labeled (b) illustrates the annual average daily cycle for both isolated and connected operation modes with ESS. The isolated case supplies about 33.7% of the total load while the sharing case supplies about 35.5% of the total load. Adding an ESS of sufficient capacity may flatten the curves of load met by shifting daytime DG to night time. The connected case performs better during the interval from about 0900 to about 1500.

ESS integration may result in an increase in the total load demand met for the whole grid sub-network, but may not increase the total load demand met for the individual premises. Table 2 presents the optimal ESS capacity for each premise in isolated mode as well as the corresponding DER resource utilization factor. The DER resource utilization factor is over about 93% for most premises except 2 and 4.

Figure 5:
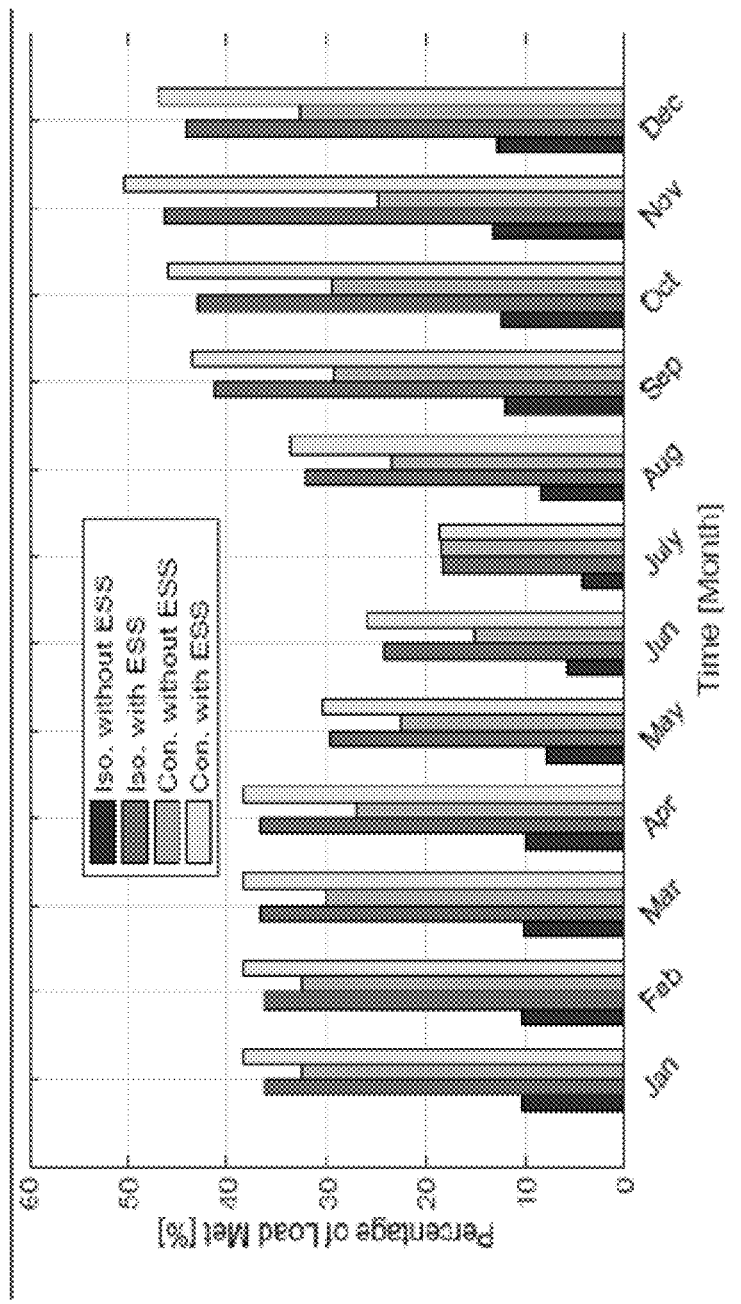
FIG. 5 illustrates the different operation scenarios with and without ESS for both isolated and shared cases for all months to represent the seasonal effect on the grid sub-network according to one particular embodiment.

FIG. 5 illustrates the different operation scenarios with and without ESS for both isolated and shared cases for all months to represent the seasonal effect on the grid sub-network according to one particular embodiment. Seasonal periods of lower insolation and temperatures may correspond to reductions in the system's ability to meet the load demand. The peak system performance, in terms of meeting load demand, may be shown to occur during the episode when loads may be relatively low and insolation may be relatively high. As shown, the case of isolated DG (without ESS) represents the poorest performance in terms of the system's ability to meet load demands. The inter-connected sharing mode represents the highest overall year-long performance for the grid sub-network. Adding ESS to the isolated case approximately triples the performance in terms of meeting the load for each premise. The shared case with ESS represents the case where the system meets load demands for five of ten premises.

Figure 6:
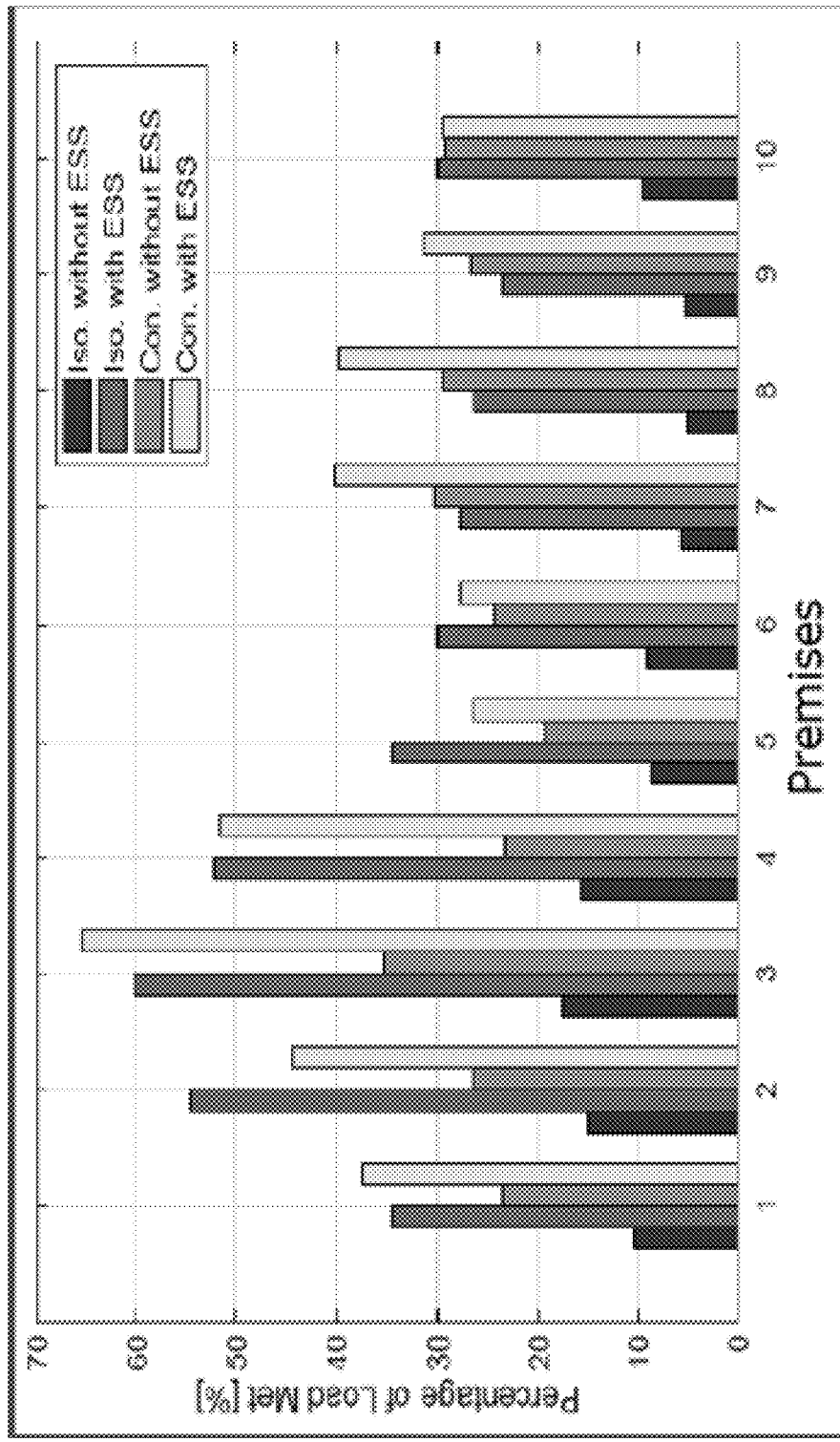
FIG. 6 illustrates a comparison of different operational modes by premise according to one particular embodiment.

FIG. 6 illustrates a comparison of different operational modes by premise according to one particular embodiment. For example, premises 2, 5, and 6 are optimized for the isolated with ESS case, and premises 4 and 10 achieve similar load carrying performance for the isolated with ESS case and the shared with ESS case. Premises 1, 3, 7, 8, and 9 achieve better performance for the shared with ESS case than all other cases. The power sharing with ESS case shows slightly better results than the isolated with ESS case, but the optimization results also indicate around a 44% reduction in the total ESS capacity on the grid sub-network. Without ESS, sharing benefits all premises in terms of annual percent load met. With ESS, some premises (those with oversized DER systems) fare better when remaining disconnected, but for this scenario, the overall investment in ESS capacity for the entire grid sub-network is nearly twice that of the shared scenario. From a system cost perspective, the connected distribution system shared ESS strategy may be more cost effective as this scenario enables around 100% of the load to be carried for a smaller capital investment in ESS.

Figure 7:
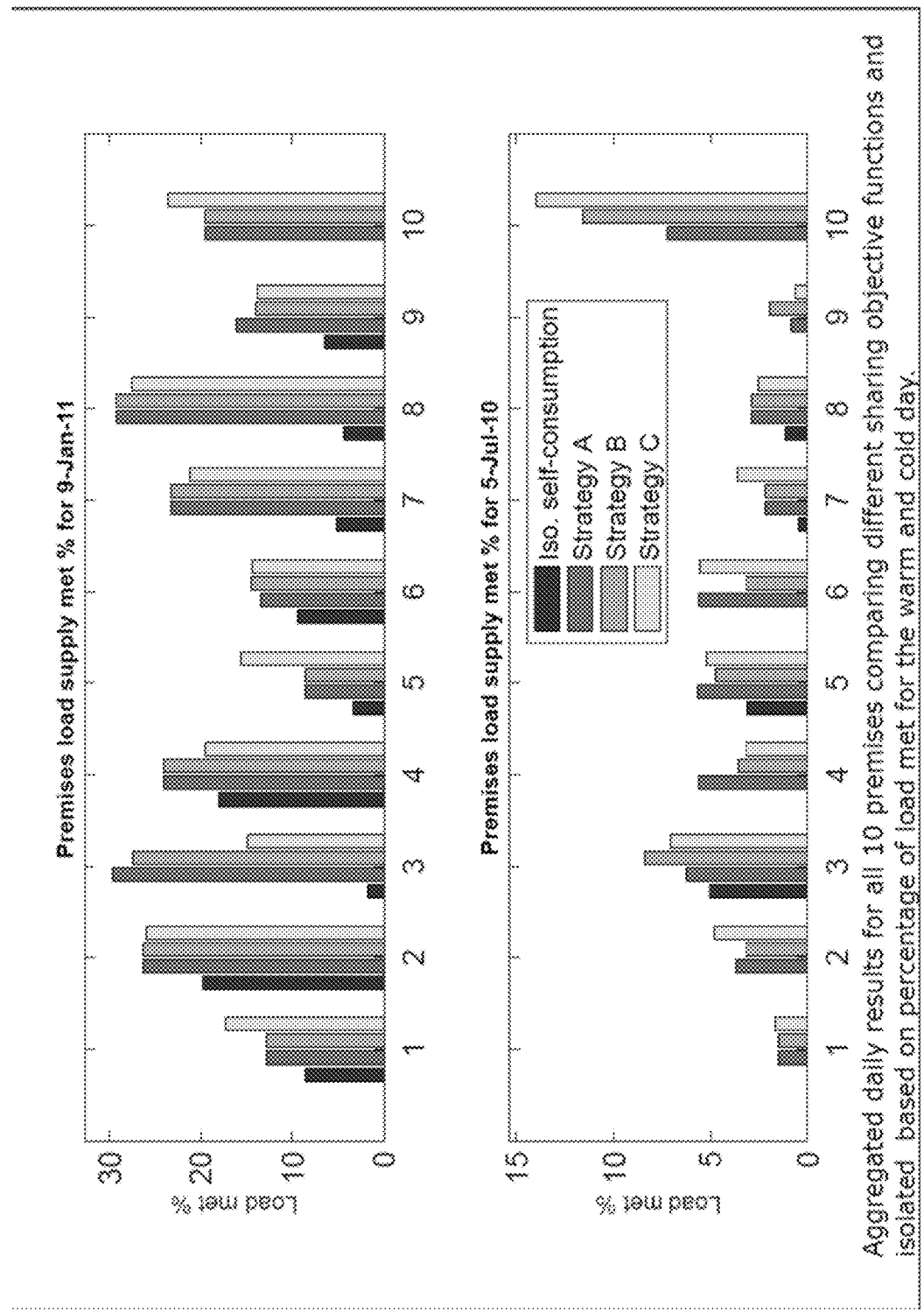
FIG. 7 illustrates aggregated daily results for premises comparing the different objective functions and isolated cases based on percentage of loads met according to one particular embodiment.

FIG. 7 illustrates aggregated daily results for premises comparing the different objective functions and isolated cases based on percentage of loads met according to one particular embodiment. The methods described herein may represent algorithmic optimizations of asset capacity sizing and operational regimes for contingency conditions during a Utility power outage. The scenarios contemplated may represent distribution system sub-networks or grid sub-networks incorporating identified premises, locations, associated DER generation capacity, and energy storage capacity.

Embodiments may include a system enabling power sharing amid a distribution grid sub-network, inclusive of grid and customer premises assets in the operation, during a plurality of utility system outage scenarios. Applying these methods for distributed control, optimization can be applied to any grid sub-network comprised of Utility and host sites for the DER, for any suitable episode duration, as specified by the user, and for any DER asset roster comprised of Utility and premise-located DER. The controller hosting the associated algorithms may arbitrate management of the premises under a control domain, represented by all, or a portion, of the grid sub-network affected by an outage.

For a given feeder or circuit in a grid sub-network, with known annual power demand and a predicted outage profile, options may be produced for any of several use-case specific parameterized combinations of DER for an optimal ESS capacity and associated operational dispatch profile specific to the control domain. With the ESS capacity determined, the recommended operational dispatch schedule may be defined by the MILP multivariable optimization process. This process output, incorporating ESS capacity and domain demand profile, may be subsequently used to instantiate scenarios for power sharing among demand in the control domain. The power sharing schema may determine which premise or group of premises may receive power under a plurality of load carrying schemes, such as single consumer, price driven sharing, spill avoidance sharing, and prioritization of service to critical loads, such as life support equipment, and other schemes.

By way of example only, the schema may utilize the predicted load and local generation capacity (i.e. DER capacity) in conjunction with ESS information (i.e. ESS state of charge, fuel tank volume capacity and level, etc.) to define the scenario-specific instantiations for shared power scheduling during the outage episode. Each premise may be equipped with a remotely operable circuit breaker, relay, switch, or other controllable isolating device which can be controlled by the distribution system operator, AMI service provider, or other host for a relevant control system(s), or an assigned third party. The DER capacities located at each of the premises and on the distribution sub-system within the control domain may be defined parameters entered by, or at the direction of, the control system operator. The total combined dispatchable DER capacity and real-time state of readiness (on/offline, SOC, fuel tank level, etc.) of any or all individual DER in the grid sub-network may be assumed to be available to the optimization engine defined herein.

Based on an operational scheme, the controller output may arbitrate which premise circuit breaker(s) or switch(es) to open or close in order to utilize all, or a portion of, the available power and energy from a given premise within the grid sub-network. Individual premises can be provided with a defined temporal schedule profile based on the operational scheme or schema and available sub-network communications infrastructure. In case of excess generation, the controller implements optimized algorithmic instructions as to which ESS in the control domain to charge. Establishing and maintaining control of the system electric frequency may require both black start and synchronization capabilities. Reference frequency control may be managed via TCP/IP or other communications datalink to the host utility's Supervisory Control and Data Acquisition (SCADA) network. A SCADA network may be common to electric Utility operations.

Three operational strategies may also be used for shared DG only, where each strategy may be associated with sub-strategies. In strategy A, the goal may be to maximize the objective function $f_1$ with all constraints for equations 3-7 indicated above, which maximizes the number of premises whose load may be served at some point. This forces all homes to receive power for at least one minimum up-time. Strategy B may maximize the objective function $f_1$ while the minimum daily connection constraint in equation 7 may be neglected. The goal may be to increase the number of switches without enforcing that all premises receive power at least once. Strategy C may maximize DG energy utilization by maximizing the objective function $f_2$ considering all constraints other than equation 7. DG may be distributed in every possible way to reduce any losses even if it means that more premises never receive power.

In other words, DER owned by premise or third party Utility customers may be used to satisfy different operational strategies. Different sharing strategies to distribute the available DER capacity across the premises of the grid sub-network may be summarized as follows: strategy A may force all premises to receive power at least once, strategy B may maximize the number of switches without forcing all premises to be connected, and C may maximize the utilization of available DER capacity distributed among the grid to reduce power loss or the duration of an outage(s). Additional strategies may be considered using a priority or fairness weighting matrix to determine scheduling. The weighting matrix may be computed by considering the load-to-generation ratio for each premise, but other weighting, based on priority of the loads in each premise, can be considered.

The sub operation strategies A+, B+ and C+ may be substantially the same as strategies A, B and C respectively with the following modifications to the objective functions:

$$f_1^* = 1^t \cdot \mathbb{W} \circ U \cdot 1 \quad (11)$$

$$f_2^* = 1^t \cdot \mathbb{W} \circ Y \cdot 1 \quad (12)$$

where $\mathbb{W}$ is a "fairness weighting" matrix of the same size of U and Y. The weighting matrix introduces preferential weighting for certain premises to receive power even though it deviates from the solutions for $f_1$ and $f_2$. The weights may be set by based on perceived fairness criteria, such as prioritizing premises with larger DG availability, lower load demand, or prioritizing critical loads (e.g. medical needs) either permanently, or during a given time span. The weights could also be based on market forces, where individual homes pay to receive priority for load. For illustrative purposes, the ratio of PV generation divided by the total load may be used as weighting function in $\mathbb{W}$.

The six strategies may be compared to the isolated strategy. This strategy can be modeled by solving the same optimization problem as in strategy (C) for each premise where the number of premises in the problem is equal to 1.

To compare the simulation results of different objective functions with the isolated operational mode, two indices may be defined herein. The first index is the percentage of supplied load, $$\% \text{ of Load met} = (Y \cdot 1) \oslash (L \cdot 1)$$

where $\oslash$ is defined as element-wise division.

Since Y, L and G are of size (N,T) multiplying Y by vector 1 of size (T,1) results in (N,1) which is the sum of supplied load for each premise for a specific day. The percentage of load met is the ratio of supplied load Y divided by the total load L for a specific day. The other index is the percentage of PV utilization of a given day, which may be determined as follows, $$\% \text{ DG Utilization} = (1^T \cdot G) \oslash (1^T \cdot L)$$

The % DG utilization reports what portion of individual premises' DG are utilized by each premise for the isolated operational mode and what portion of total DG in a sub-network is utilized for the inter-connected sharing strategies.

Referring back to FIG. 7, the January 9 graph may be representative for days when the peak of the aggregate DG may be higher than the total load and therefore all premises can be powered during that time, independent of strategy. For example, on January 9, the amount of load supply met for isolated premises ranges from about 0% to about 20%. Applying strategy A to the premises increases the range, such that the load met is about 10% to about 30%. Applying strategy B to the premises does not substantially change the load supply met. Finally, strategy C shows mixed results. Strategy C improves the load met for premises 1, 5, and 10, decreases the load met for premises 3 and 4, and minimally changes the load met for premises 2, 6, 7, 8, and 9, compared to Strategy A and Strategy B.

July 5 may be representative of a day with low DG and high load demand which tends to emphasize differences between the strategies. Gains from sharing compared to self-consuming were larger: all 10 premises were powered with energy sharing while 4 premises received some energy from their own DG. Results for July 5 may vary by operational strategies A, B, and C. For example, strategy A overwhelmingly improves isolated cases. Strategy A has the least effect on premise 3. Strategy B has mixed results, where the load met noticeably improves for premises 3, 9, and 10. Strategy B decreased the load met for premises 2, 4, and 6. Strategy B had a negligible impact on premises 1, 5, 7, and 8. When strategy C was applied, the loads met were generally comparable to strategy A loads met, such as premises 1, 3, 4, 5, 8, and 9. Strategy C was most effective for premise 10 and showed increases for premises 2 and 7. Strategy C had a small impact for premise 6, compared to strategy A. Considering both days, premise 10 may benefit from strategy C in all use cases. For these two days, no superior use case among the inter-connected sharing operational strategies, but sharing energy may be advantageous for every premise.

Figure 8:
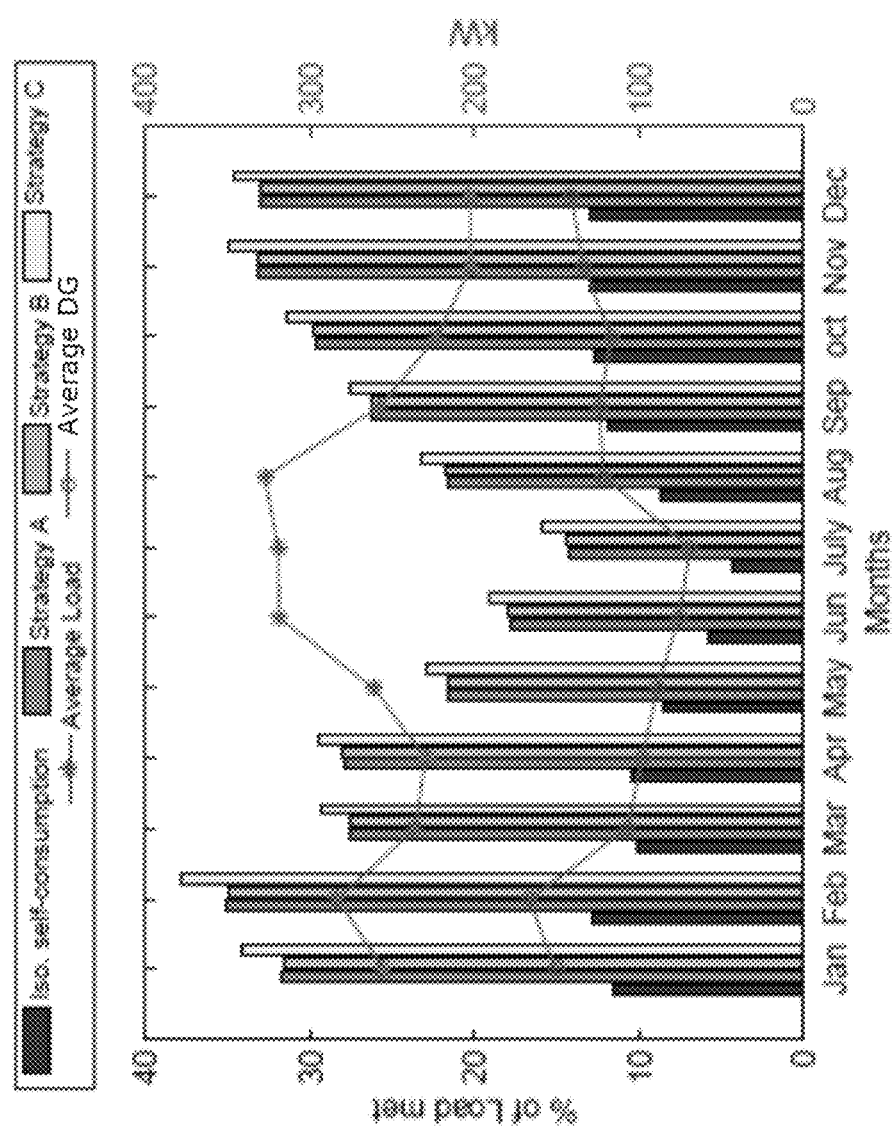
FIG. 8 illustrates an averaged percentage of load met by month for premises over a year according to one particular embodiment.

FIG. 8 illustrates an averaged percentage of load met by month for premises over a year according to one particular embodiment. A graph is used to compare results for distinct months versus a one year episode to quantify the performance of each strategy based on each objective function: isolated and strategies A, B and C. The graph may indicate a seasonal trend. Data from warmer months may show a higher percentage of load met due to higher DG production. In all data episodes, the isolated case performs lowest in terms of meeting load, while strategy C performs best. There may be negligible differences between strategies A and B.

Figure 9:
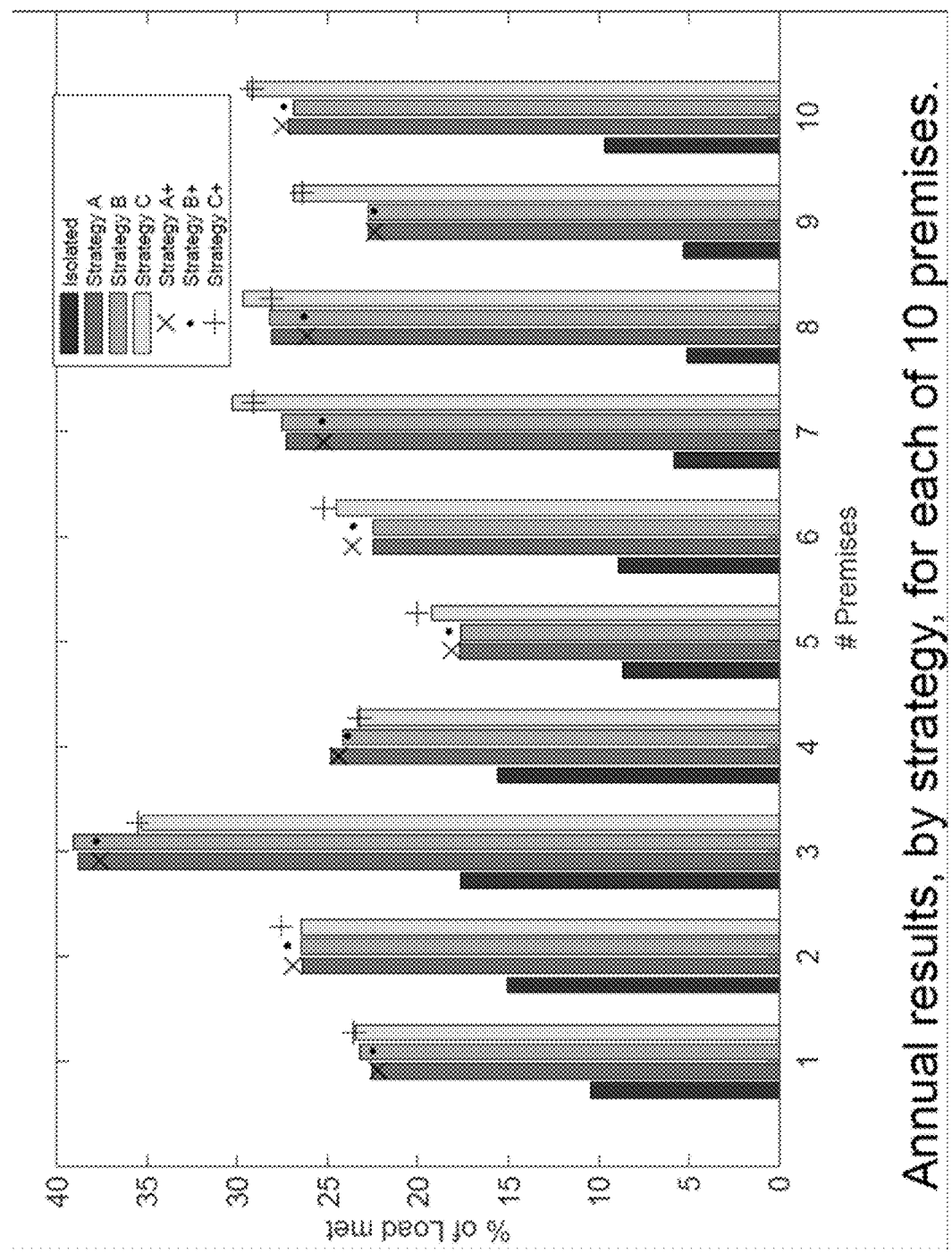
FIG. 9 illustrates the percentage of load met in different operation modes for different numbers of premises according to one particular embodiment.

FIG. 9 illustrates the percentage of load met in different operation modes for different numbers of premises according to one particular embodiment. FIG. 9 shows that all premises benefit from energy sharing, with a performance improvement ranging from about 40% to about 85%. This value varies over the premises but it may be consistent so that all may operate better in inter-connected sharing mode. As represented in equations 11 and 12, strategies A+, B+, and C+ use the same objective function, but include the weighting matrix, which prioritizes additional constraints. In some embodiments, the weighting matrix is defined based on the ratio of DG to load.

Comparing the strategies, all of them improved the performance of the premises compared to the isolated case. Strategy A and strategy B performed relatively equally for the premises. In particular, premises 3 and 4 show increased performance, respectively, in the strategy A and strategy B case. Strategy C improved the performance of premises 1, 5, 6, 7, 8, 9, and 10, compared to strategy A and strategy B. For premise 2, each of the three strategies represented substantially equal performance. Strategies A, B and C show comparatively consistent performance improvements relative to strategies A+, B+ and C+. Premises 2, 5, and 6 benefit from applying the fairness weighting matrix, while premises 1, 4, 9, and 10 may or may not be affected, and premises 3, 7, and 8 decreased their percentage of load met. This result shows the effect of W. Among the six shared strategies, strategies C and C+ provided the highest percentage of load met. For these, seven out of ten premises benefited from strategies C and C+, compared to the four other strategies.

Table 3 shows results for the number of days, over a one year episode, that a given number of premises receive power for the minimum up-time of about 1.5 hours per connect period for each of the different operating strategies. As defined, strategy A, representing the use case for maximizing the number of premises served during the outage episode, yields the most days for all premises to be served at least once for a minimum up-time period. For about six days during the one year episode, the optimization did not yield any results. For strategy A, the annual average percentage of load met was about 25.66%. Relaxing the up-time constraint to about 1 hour instead of about 1.5 hours allows all premises to be on for every day of the year. Strategy C was able to sustain about a minimum 1.5 hour up-time episode for ten premises over about 347 days. Six premises sustained operations thought the year scenario. Strategy B provided the lowest performance; ten premises were sustained for about 341 days.

TABLE 3

Number of Premises Supplied For Different Strategies.

| Strategy A | | | Strategy B | | | Strategy C | | |
|---|---|---|---|---|---|---|---|---|
| P | Days | % Load met | P | Days | % Load met | P | Days | % Load met |
| 10 | 359 | 25.66 | 10 | 341 | 26.07 | 10 | 347 | 27.47 |
| | | | 9 | 352 | 25.55 | 9 | 356 | 26.91 |
| | | | 8 | 359 | 25.07 | 8 | 363 | 26.43 |
| | | | 7 | 362 | 24.83 | 6 | 365 | 26.3 |
| | | | 6 | 365 | 24.66 | | | |

Table 4 below summarizes the non-ESS strategy-specific annual performance for isolated and shared energy scenarios. The isolated case may be the lowest performance operational mode in terms of both percentage load met and DG utilization where it scored about 65% below the highest performing strategy. In terms of the average number of premises to be supported, the isolated case also represented the lowest performance. Strategies C and C+ differed by less than about 0.2% and provide the highest performance indices. In general, each given strategy and its weighted version, for example strategies C and C+, may be shown to yield similar grid sub-network scale results. This may be because the weighted strategy addresses prioritization of specific premises in the sub-network according to the terms represented in $W$, resulting in changes in the amount of energy supplied to each premise.

TABLE 4

Percent Load Met, Percent DG Utilized, and Average Number of Premises Supported For Different Operating Strategies Averaged Over A Year.

| Per Annum | Isolated | Shared Strategies | | | | | |
|---|---|---|---|---|---|---|---|
| | | A | A+ | B | B+ | C | C+ |
| % of Load met | 9.17 | 24.64 | 24.43 | 24.66 | 24.49 | 26.3 | 26.26 |
| % DG utilized | 29.25 | 78.59 | 77.93 | 78.66 | 78.11 | 83.9 | 83.77 |
| Avg # supported premises | 7.78 | 10* | 10* | 9.7 | 9.69 | 9.61 | 9.71 |

As a result, based on MILP computational methods, results for the optimization-based scheduling of load for a group of electrically connectable premises, each with DG or ESS, that may be connected to the distribution network via a single point of common coupling. In the case of a single building, hardware (e.g., subsystem controller) and governance (e.g., building owner or homeowners association) issues may be much more straightforward than for different buildings in a neighborhood. In the MILP formulation, residential participation (e.g., each premise with a single meter may be considered a load) may be parametrized with a binary or integer component, while the optimization aims to maximize the number of loads that receive power, despite the insufficient DER power generation at all times to meet the electricity demand within the grid sub-network. The input to the optimization may be the forecasted DER and load for each premise. A control module hosted in a grid sub-network controller, or other network-based control system, may be configured to periodically or regularly re-optimize the grid sub-network to determine which premises are included in operations and under which associated scheme, schema, strategy or strategies.

Figure 10:
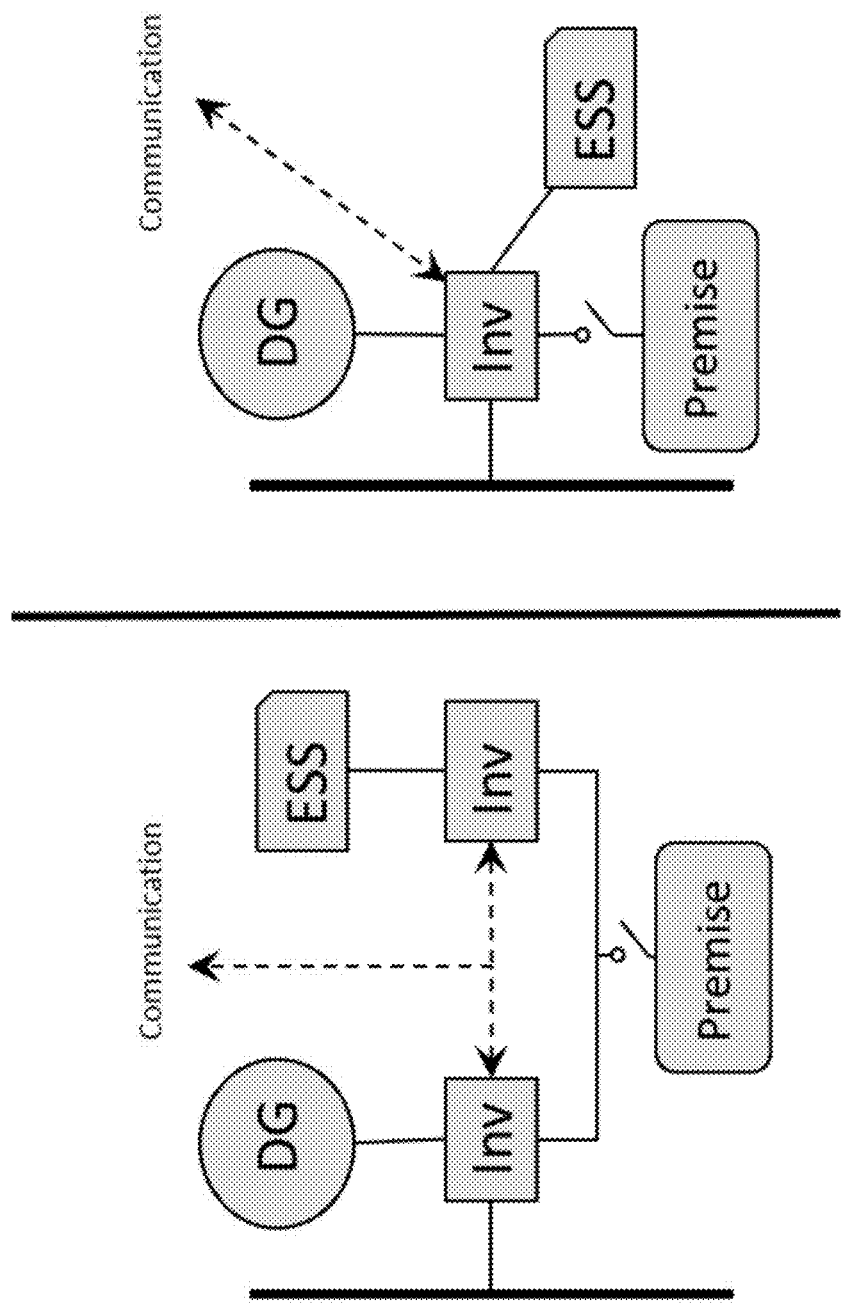
FIG. 10 illustrates ways by which a premise power grid may be configured according to one particular embodiment.

FIG. 10 illustrates ways by which a premise power grid may be configured according to one particular embodiment. Herein, an inverter is a component of a DER which serves to convert DC power to AC power or vice versa. In some cases inverters may be operated uni-directionally or bi-directionally—that is to convert power from DC to AC, or AC to DC, as required by the application. Such inverters may be defined, for Utility interconnection purposes, by the family of standards under IEEE 1547, or other relevant international standards, as applicable. In one embodiment, a premise may have a DG connected to a first inverter and an ESS connected to a second inverter. The inverters may electronically communicate with an outside DER separately or together. In some embodiments, the premise may have a DG and ESS connected to a single inverter. The single inverter may communicate with an outside DER. The grid sub-network may be otherwise configured, such that there are multiple PCCs, multiple energy storage systems, multiple DGs, and multiple DERs.

Figure 11:
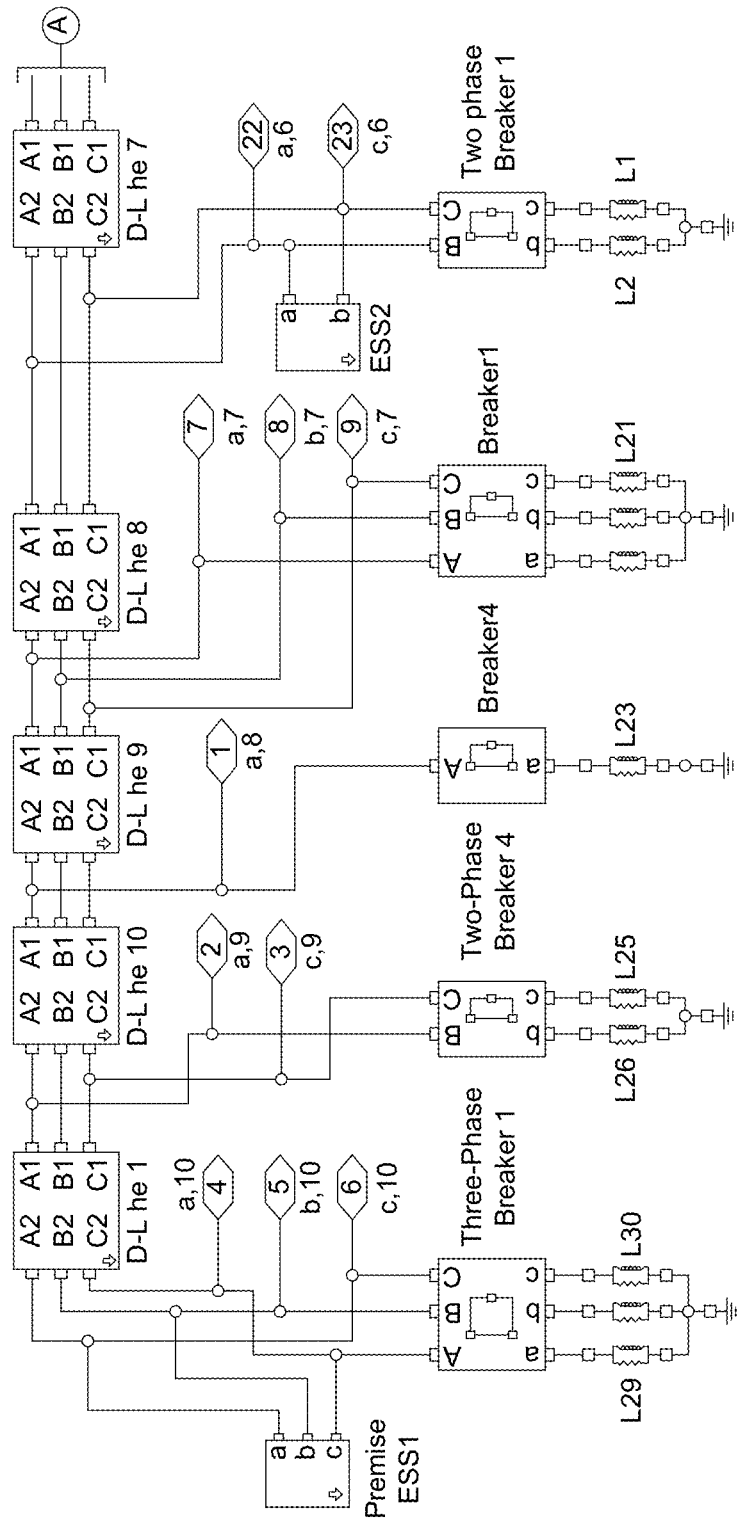
FIG. 11 is a schematic illustrating a system configured to distribute power among premises with ESS substations and switches according to one particular embodiment.
Figure 11:
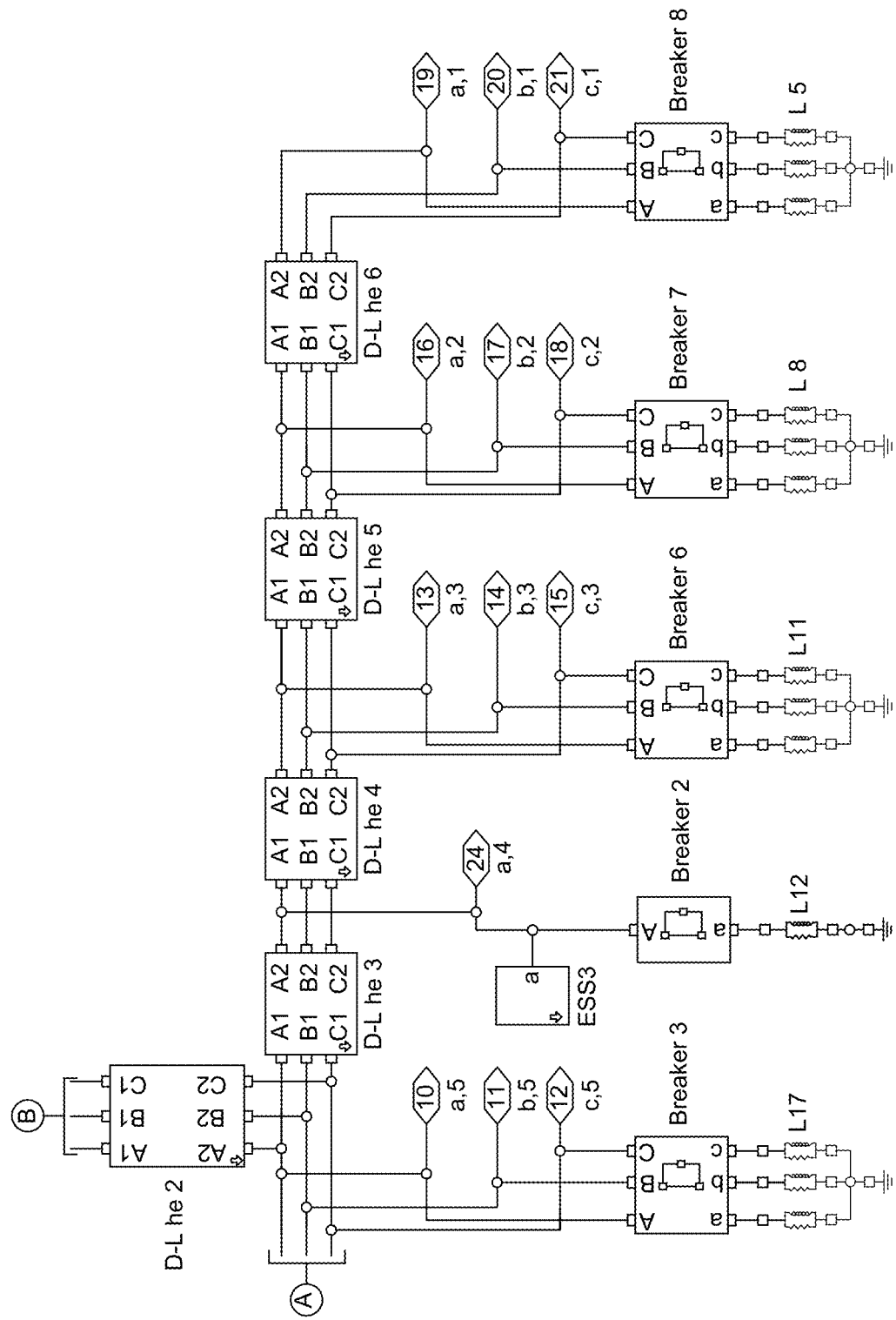
Figure 11:
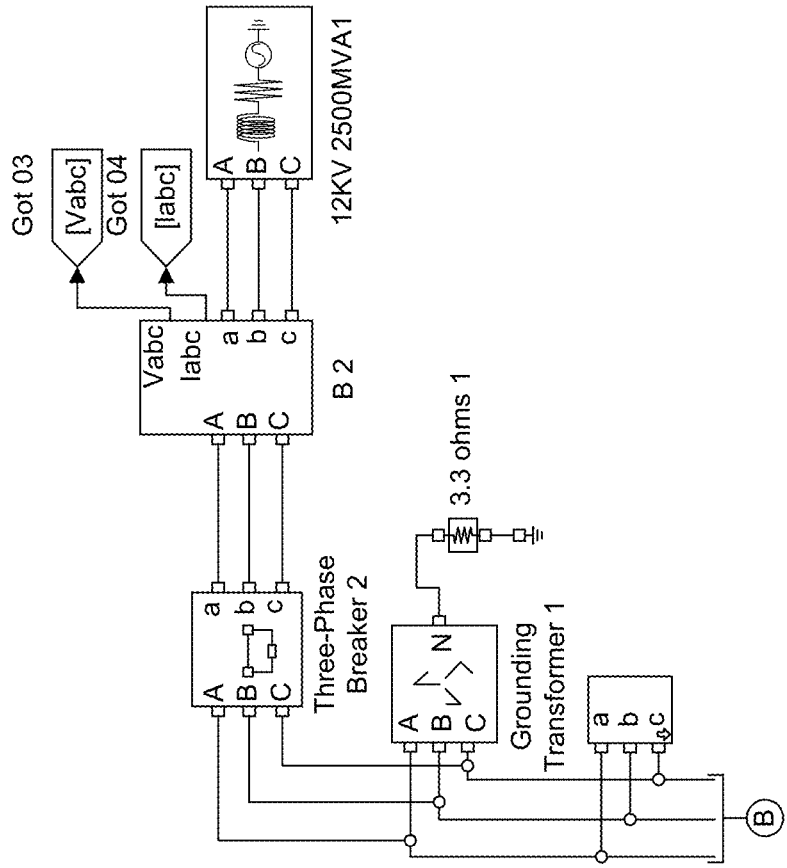

FIG. 11 is a schematic illustrating a system configured to distribute power among premises with ESS and control capabilities according to one particular embodiment. The system may represent one configuration of a grid sub-network. For example, the premises may be residential, commercial, or other premises. The illustrated d-lines may model power lines. Individual premises may or may not have a decentralized ESS. Individual premises may have one or more devices affecting interconnection and operational control. The individual premises may have individual loads or multiple loads resulting from an individual premise topology and associated electric load. The individual premises may have different configurations, as described herein. The premises may be electrically and communications-wise connected to a Utility distribution network though any commonly implemented Utility practice(s). The schematic may instantiate one scenario of premises connected to a grid. The schematic may be able to simulate isolated and connected cases with various permutations, which may electrically isolate some premises, which may distribute the energy of one or some premise or Utility ESS, or instantiate one or more grid sub-network(s).

Figure 12:
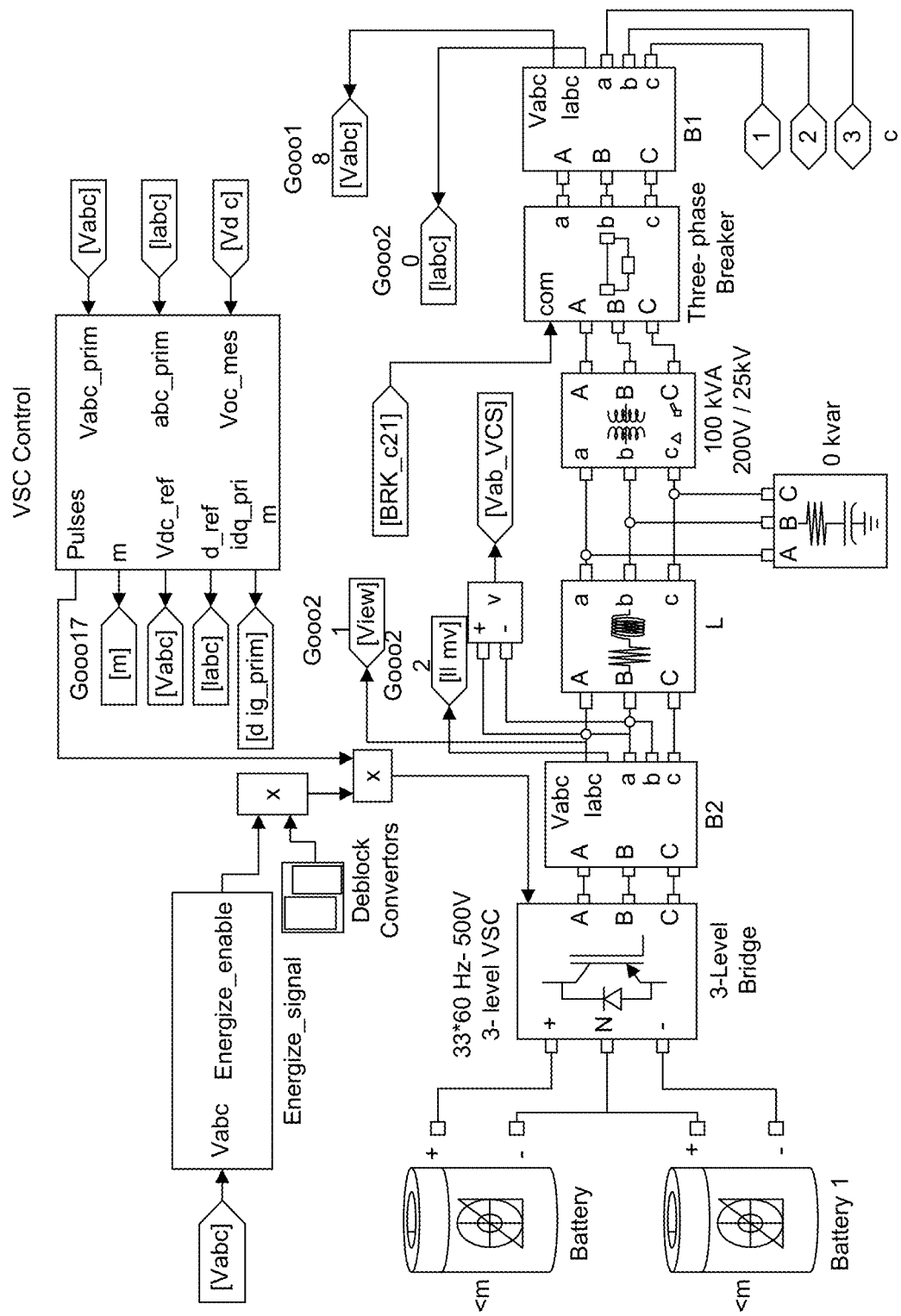
FIG. 12 is a schematic illustrating an energy distribution system according to one particular embodiment.

FIG. 12 is a schematic illustrating an energy distribution system according to one particular embodiment. The schematic may describe how energy is stored or sourced from an ESS. The ESS may include a stand-alone Un-interruptible Power Supply (UPS) battery for the purposes of maintaining control operation. The schematic may indicate the presence of control logic for a system to maintain, control, and/or distribute energy stored by the ESS, including inverter functionality to facilitate converting energy from AC to DC and vice versa. The voltage control may be represented by VSC control. The energy from the ESS may go through a step down or step up transformer based on energy needs. The converted energy may be distributed to a load, represented as B1. The system may describe a device capable of measuring the amount of energy stored. The measurements may be used in distributing the energy in accordance with one of the strategies mentioned herein.

Figure 13:
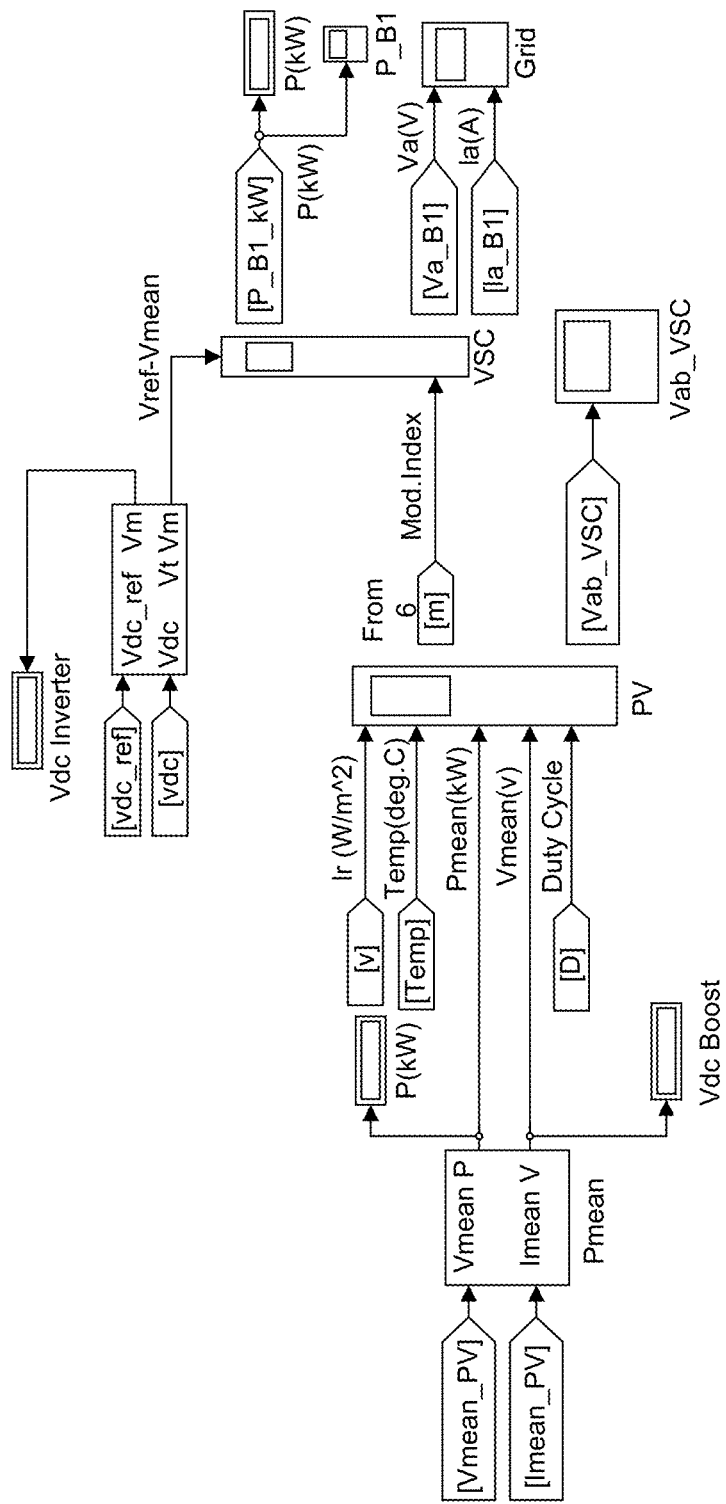
FIG. 13 is a schematic illustrating control logic for a shared power generation system according to one particular embodiment.

FIG. 13 is a schematic illustrating control logic for a shared power generation system according to one particular embodiment. The schematic may describe how energy from a DG is transferred to a grid network or grid sub-network. The schematic may indicate control logic for a system to distribute energy produced by the DER, such as a solar photovoltaic system. A control system, including the control logic, may control the process used to convert energy from AC to DC and vice versa, such that the energy is ready for delivery to a premise. The control system may have a device capable of measuring the amount of power and/or energy generated. The power and/or energy measurements may be used in distributing the energy in accordance with one of the strategies mentioned herein.

Figure 14:
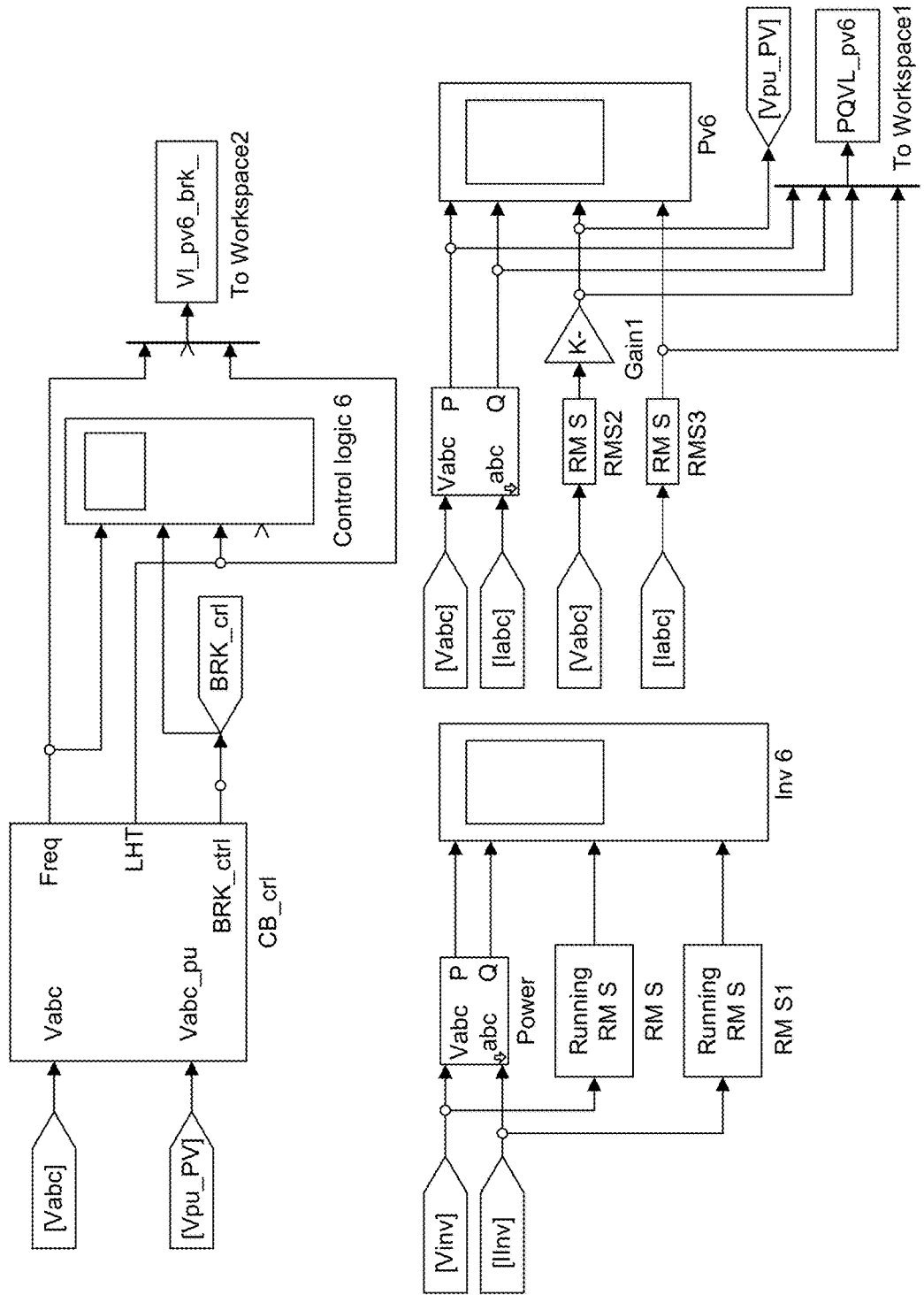
FIG. 14 is a schematic illustrating control logic for a shared power generation system according to one particular embodiment.

FIG. 14 is a schematic illustrating control logic for a shared power generation system according to one particular embodiment. The schematic may describe a control system to distribute energy from DER, DGs or ESS. The control system may have a device capable of measuring the amount of power and/or energy generated. The power and/or energy measurements may be used in distributing the energy in accordance with one of the strategies mentioned herein.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 15:
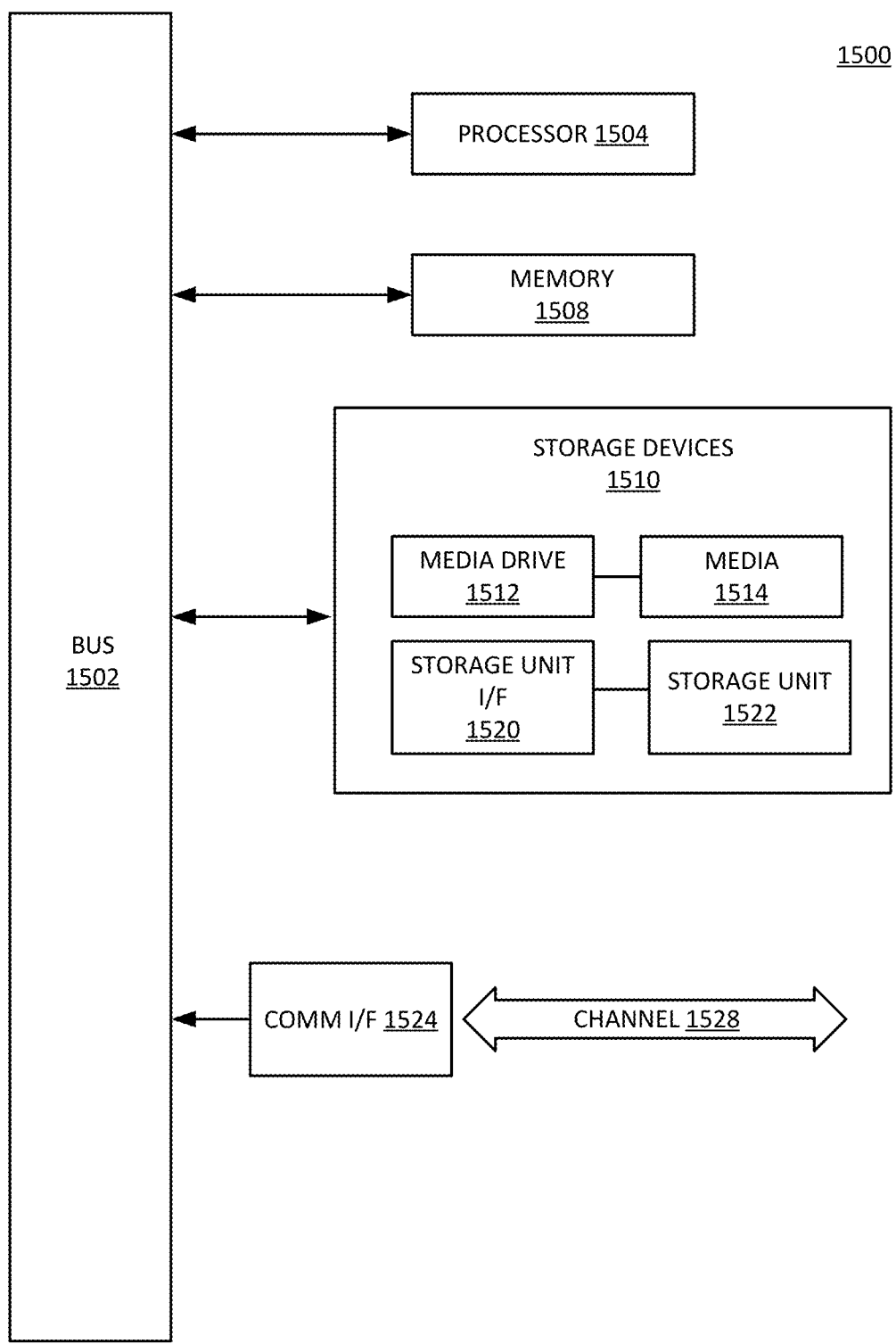
FIG. 15 illustrates an example computing component that may be used in implementing various features of embodiments of the disclosed technology.

As used herein, a circuit might be implemented utilizing any form of hardware, software, or a combination thereof. For example, one or more conductors, connectors, relays, switches, regulators, line capacitors, processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 15. Various embodiments are described in terms of this example-computing system 1500. After reading this description, it will become apparent to a person skilled in the relevant art how to implement the technology using other computing systems or architectures.

Referring now to FIG. 15, computing system 1500 may represent, for example, computing or processing capabilities found within desktop, laptop and notebook computers; hand-held computing devices (smart phones, cell phones, palmtops, tablets, etc.); mainframes, supercomputers, distributed applications, distributed autonomous organizations, workstations or servers; or any other type of special-purpose or general-purpose computing devices as may be desirable or appropriate for a given application or environment. Computing system 1500 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1500 might include, for example, one or more processors, controllers, control components, or other processing devices, such as a processor 1504. Processor 1504 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1504 is connected to a bus 1502, although any communication medium can be used to facilitate interaction with other components of computing system 1500 or to communicate externally.

Computing system 1500 might also include one or more memory components, simply referred to herein as main memory 1508. For example, in some embodiments random access memory (RAM) or other dynamic memory, might be used for storing information and instructions to be executed by processor 1504. Main memory 1508 might also be used for storing temporary variables or other intermediate information during execution of instructions to be executed by processor 1504. Computing system 1500 might likewise include a read only memory ("ROM") or other static storage device coupled to bus 1502 for storing static information and instructions for processor 1504.

The computing system 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a floppy disk drive, a magnetic tape drive, an optical disk drive, a CD or DVD drive (R or RW), a flash drive, or other removable or fixed media drive might be provided, SQL/NOSQL data bases, or other data bases. Accordingly, storage media 1514 might include, for example, a hard disk, a floppy disk, magnetic tape, cartridge, optical disk, a CD or DVD, or other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing system 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory component) and memory slot, a flash drive and associated slot (for example, a USB drive), a PCMCIA slot and card, and other fixed or removable storage units 1522 and interfaces 1520 that allow software and data to be transferred from the storage unit 1522 to computing system 1500.

Computing system 1500 might also include a communications interface 1524. Communications interface 1524 might be used to allow software and data to be transferred between computing system 1500 and external devices. Examples of communications interface 1524 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1524 might be carried on signals, which can be electronic, electromagnetic (which includes optical) or other signals capable of being exchanged by a given communications interface 1524. These signals might be provided to communications interface 1524 via a channel 1528. This channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1508, storage unit 1520, media 1514, and channel 1528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and embodiments, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various elements of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for optimizing energy distribution, the method comprising:
  receiving a request for separating a grid sub-network from a greater grid network, wherein the grid sub-network is connected to the greater grid network at a grid point of common coupling, and wherein the greater grid network comprises a first set of premises, a first set of energy resources, and a first set of premise points of common coupling;
  separating the grid sub-network from the greater grid network at the grid point of common coupling, wherein the grid sub-network comprises a second set of premises, a second set of energy resources, and a second set of premise points of common coupling, wherein the second set of premises comprises a first subset of premises and a second subset of premises, wherein the second set of energy resources comprises a first subset of energy resources and a second subset of energy resources, and wherein individual ones of the first subset of energy resources are coupled to individuals ones of the first subset of premises; and
  distributing energy from the first subset of energy resources to at least some of the second set of premises based on an independent and autonomous mode of control via a controller for the grid subnetwork, wherein the controller improves reliability of the grid subnetwork in the independent and autonomous mode of control based on participation of the second set of premises in the grid sub-network, wherein the independent and autonomous mode of control is based on at least an array of connection statuses for the second set of premises during a temporal window, wherein each element in the array of connection statuses define an individual premise switch position corresponding to an individual premise of the second set of premises.

2. The method of claim 1, wherein the first set of energy resources and the second set of energy resources comprise:
  a first set of energy storage systems configured to store energy and provide energy to at least some of the first set of premises;
  a second set of energy storage systems configured to store energy and provide energy to at least some of the second set of premises;
  a first set of energy generation resources configured to generate energy; and
  a second set of energy generation resources configured to generate energy.

3. The method of claim 2, wherein the second set of individual premises are connected to the grid sub-network, such that energy from the second set of energy storage systems and the second set of energy generation resources are shared among the second set of premises, and wherein the first set of individual premises are connected to the greater grid network, such that energy from the first set of energy storage systems and the first set of energy generation resources are shared among the first set of premises.

4. The method of claim 1, wherein distributing energy from at least some of the second set of energy resources to at least some of the second set of premises comprises maximizing a number of the second set of premises whose load is served, and wherein distributing energy from at least some of the first set of energy resources to at least some of the first set of premises comprises maximizing a number of the first set of premises whose load is served.

5. The method of claim 1, wherein distributing energy from at least some of the second set of energy resources to at least some of the second set of premises comprises maximizing a number of switches made to the second set of individual premise points of common coupling, and wherein distributing energy from at least some of the first set of energy resources to at least some of the first set of premises comprises maximizing a number of switches made to the first set of individual premise points of common coupling.

6. The method of claim 1, wherein distributing energy from at least some of the second set of energy resources to at least some of the second set of premises comprises maximizing a utilization of the second set of energy generation resources to reduce power losses, and wherein distributing energy from at least some of the first set of energy resources to at least some of the first set of premises comprises maximizing a utilization of the first set of energy generation resources to reduce power losses.

7. The method of claim 1, wherein distributing energy from at least some of the second set of energy resources to at least some of the second set of premises is based on a second weighting matrix, and wherein distributing energy from at least some of the first set of energy resources to at least some of the first set of premises is based on a first weighting matrix.

8. The method of claim 7, wherein the first weighting matrix and the second weighting matrix prioritize loads based on a load-to-generation ratio for individual premises.

9. The method of claim 7, wherein first weighting matrix and the second weighting matrix prioritize critical loads.

10. The method of claim 1, wherein distributing energy from at least some of the second set of energy resources to at least some of the second set of premises comprises controlling a frequency of the energy to mitigate harmonic disturbances, and wherein distributing energy from at least some of the first set of energy resources to at least some of the first set of premises comprises controlling a frequency of the energy to mitigate harmonic disturbances.

11. The method of claim 1, wherein the second set of premises, the second set of energy resources, and the second set of premise points of common coupling may be a subset of the first set of premises, the first set of energy resources, and the first set of premise points of common coupling, respectively.

12. A system comprising:
one or more servers;
one or more electronic storage units;
a non-transitory computer readable medium having machine readable instructions stored thereon which, when executed by one or more processing engines, causes the system to:
receive a request for separating a grid sub-network from a greater grid network, wherein the grid sub-network is connected to the greater grid network at a grid point of common coupling, and wherein the greater grid network comprises a first set of premises, a first set of energy resources, and a first set of premise points of common coupling;
separate the grid sub-network from the greater grid network at the grid point of common coupling, wherein the grid sub-network comprises a second set of premises, a second set of energy resources, and a second set of premise points of common coupling, wherein the second set of premises comprises a first subset of premises and a second subset of premises, wherein the second set of energy resources comprises a first subset of energy resources and a second subset of energy resources, and wherein individual ones of the first subset of energy resources are coupled to individuals ones of at least some of the first subset of premises; and
distribute energy from the first subset of energy resources to at least some of the second set of premises based on an independent and autonomous mode of control, via a controller for the grid sub-network, wherein the controller improves reliability of the grid subnetwork in the independent and autonomous mode of control based on participation of the second set of premises in the grid sub-network, wherein the independent and autonomous mode of control is based on at least an array of connection statuses for the second set of premises during a temporal window, wherein each element in the array of connection statuses define an individual premise switch position corresponding to an individual premise of the second set of premises.

13. The system of claim 12,
wherein the first set of energy resources and the second set of energy resources comprise:
a first set of energy storage systems configured to store energy and provide energy to at least some of the first set of premises;
a second set of energy storage systems configured to store energy and provide energy to at least some of the second set of premises;
a first set of energy generation resources configured to generate energy; and
a second set of energy generation resources configured to generate energy.

14. The system of claim 13, wherein the second set of individual premises are connected to the grid sub-network, such that energy from the second set of energy storage systems and the second set of energy generation resources are shared among the second set of premises, and wherein the first set of individual premises are connected to the greater grid network, such that energy from the first set of energy storage systems and the first set of energy generation resources are shared among the first set of premises.

15. The system of claim 13, wherein to distribute energy from at least some of the second set of energy resources to at least some of the second set of premises, the non-transitory computer-readable medium further stores instructions that cause the one or more processing engines to maximize a utilization of the first set of energy generation resources to reduce power losses, and wherein to distribute energy from at least some of the first set of energy resources to at least some of the first set of premises, the non-transitory computer-readable medium further stores instructions that cause the one or more processing engines to maximize a utilization of the first set of energy generation resources to reduce power losses.

16. The system of claim 12, wherein to distribute energy from at least some of the second set of energy resources to at least some of the second set of premises, the non-transitory computer-readable medium further stores instructions that cause the one or more processing engines to maximize a number of the second set of premises whose load is served, and wherein to distribute energy from at least some of the first set of energy resources to at least some of the first set of premises, the non-transitory computer-readable medium further stores instructions that cause the one or more processing engines to maximize a number of the first set of premises whose load is served.

17. The system of claim 12, wherein to distribute energy from at least some of the second set of energy resources to at least some of the second set of premises, the non-transitory computer-readable medium further stores instructions that cause the one or more processing engines to maximize a number of switches made to the second set of individual premise points of common coupling, and wherein to distribute energy from at least some of the first set of energy resources to at least some of the first set of premises, the non-transitory computer-readable medium further stores instructions that cause the one or more processing engines to maximize a number of switches made to the first set of individual premise points of common coupling.

18. The system of claim 12, wherein to distribute energy from at least some of the second set of energy resources to the second set of premises, the non-transitory computer-readable medium further stores instructions that cause the one or more processing engines to utilize a first weighting matrix, and wherein to distribute energy from at least some of the first set of energy resources to the first set of premises, the non-transitory computer-readable medium further stores instructions that cause the one or more processing engines to utilize a second weighting matrix.

19. The system of claim 18, wherein the first weighting matrix and the second weighting matrix prioritize loads based on a load-to-generation ratio for individual premises.

20. The system of claim 18, wherein the first weighting matrix and the second weighting matrix prioritize critical loads.

21. The system of claim 12, wherein to distribute energy from at least some of the second set of energy resources to at least some of the second premises, the non-transitory computer-readable medium further stores instructions that cause the one or more processing engines to control a frequency of the energy to mitigate harmonic disturbances, and wherein to distribute energy from at least some of the first set of energy resources to at least some of the first premises, the non-transitory computer-readable medium further stores instructions that cause the one or more processing engines to control a frequency of the energy to mitigate harmonic disturbances.

22. The system of claim 12, wherein the second set of premises, the second set of energy resources, and the second set of premise points of common coupling may be a subset of the first set of premises, the first set of energy resources, and the first set of premise points of common coupling, respectively.

* * * * *